(12) United States Patent
Saliba et al.

(10) Patent No.: US 12,182,069 B2
(45) Date of Patent: Dec. 31, 2024

(54) SYSTEM AND METHOD FOR IDENTIFYING FILES BASED ON HASH VALUES

(71) Applicant: Magnet Forensics Inc., Waterloo (CA)

(72) Inventors: Jad John Saliba, Waterloo (CA); John Wiley Singleton, Abingdon, VA (US)

(73) Assignee: Magnet Forensics Inc., Waterloo (CA)

( * ) Notice: Subject to any disclaimer, the term of this patent is extended or adjusted under 35 U.S.C. 154(b) by 0 days.

(21) Appl. No.: 17/319,540

(22) Filed: May 13, 2021

(65) Prior Publication Data

US 2021/0357364 A1 Nov. 18, 2021

Related U.S. Application Data

(60) Provisional application No. 63/023,909, filed on May 13, 2020.

(51) Int. Cl.
*G06F 7/00* (2006.01)
*G06F 16/13* (2019.01)
*G06F 16/14* (2019.01)

(52) U.S. Cl.
CPC .......... *G06F 16/152* (2019.01); *G06F 16/137* (2019.01); *G06F 16/156* (2019.01)

(58) Field of Classification Search
CPC .... G06F 16/152; G06F 16/137; G06F 16/156; G06F 21/565; G06F 21/577
See application file for complete search history.

(56) References Cited

U.S. PATENT DOCUMENTS 5,990,810 A * 11/1999 Williams .............. G06F 3/0641
341/51
6,021,510 A * 2/2000 Nachenberg .......... G06F 21/564
714/48
(Continued)

FOREIGN PATENT DOCUMENTS

CN 108733843 A 11/2018

OTHER PUBLICATIONS

"Browse the source code of glibc/strong/strcmp.c", Oct. 4, 2017, downloaded from https://web.archive.org/web/20171004062137/https://code.woboq.org/userspace/glibc/strcmp.c.html.
(Continued)

*Primary Examiner* — Mohammed R Uddin
(74) *Attorney, Agent, or Firm* — Own Innovation; Kent Howe; James W. Hinton

(57) ABSTRACT

Computer systems and computer-implemented methods for forensically investigating a target dataset including a target file by comparing the target file to a source file are provided. The method includes performing a preliminary matching operation. The preliminary matching operation includes performing at least one of a file size matching operation, in which a target file size is compared to a source file size, and a sub-hash matching operation, in which a target file sub-hash is compared to a source file sub-hash. A sub-hash is a hash value calculated using a subset of data from the file. The method further includes performing a full hash matching operation if the preliminary matching operation identifies a preliminary match. The full hash matching operation includes generating a target file full hash value and comparing the target file full hash value to a source file full hash value.

11 Claims, 9 Drawing Sheets

(56) References Cited

U.S. PATENT DOCUMENTS

| | | | | | |
|---|---|---|---|---|---|
| 7,716,196 | B2* | 5/2010 | Ghielmetti | | G06F 16/93 |
| | | | | | 707/747 |
| 8,230,510 | B1* | 7/2012 | Yang | | G06F 21/564 |
| | | | | | 726/25 |
| 8,433,959 | B1* | 4/2013 | Garfinkel | | G06F 3/0611 |
| | | | | | 707/899 |
| 8,756,249 | B1* | 6/2014 | Wallace | | G06F 16/148 |
| | | | | | 707/688 |
| 8,813,222 | B1* | 8/2014 | Codreanu | | G06F 21/56 |
| | | | | | 726/22 |
| 9,158,842 | B1* | 10/2015 | Yagnik | | G06F 16/683 |
| 11,409,753 | B2* | 8/2022 | Boles | | G06F 16/2462 |
| 2005/0004954 | A1* | 1/2005 | Soule | | G06F 16/20 |
| | | | | | 707/999.203 |
| 2006/0168006 | A1* | 7/2006 | Shannon | | H04L 51/212 |
| | | | | | 709/206 |
| 2007/0112783 | A1* | 5/2007 | McCreight | | G06Q 10/00 |
| 2007/0180265 | A1* | 8/2007 | Hiroshi | | G06F 16/10 |
| | | | | | 713/187 |
| 2010/0235392 | A1* | 9/2010 | McCreight | | G06F 21/6209 |
| | | | | | 707/E17.014 |
| 2011/0138465 | A1* | 6/2011 | Franklin | | G06F 21/564 |
| | | | | | 726/23 |
| 2013/0066901 | A1* | 3/2013 | Marcelais | | G06F 16/137 |
| | | | | | 707/769 |
| 2013/0246378 | A1* | 9/2013 | Hearnden | | H04L 63/12 |
| | | | | | 707/698 |
| 2013/0268496 | A1* | 10/2013 | Baldwin | | G06F 16/1748 |
| | | | | | 707/E17.002 |
| 2014/0075542 | A1* | 3/2014 | Boback | | G06F 21/6272 |
| | | | | | 726/15 |
| 2014/0164352 | A1* | 6/2014 | Denninghoff | | H03H 9/25 |
| | | | | | 707/711 |
| 2014/0279933 | A1* | 9/2014 | Blasko | | G06F 16/174 |
| | | | | | 707/687 |
| 2015/0006475 | A1* | 1/2015 | Guo | | G06F 16/1752 |
| | | | | | 707/693 |
| 2015/0074007 | A1* | 3/2015 | Gabriel | | G06Q 10/10 |
| | | | | | 705/311 |
| 2015/0199243 | A1* | 7/2015 | Wu | | G06F 16/182 |
| | | | | | 707/626 |
| 2018/0357431 | A1* | 12/2018 | Ellingson | | H04L 63/102 |
| 2019/0251189 | A1* | 8/2019 | VanderSpek | | G06F 16/1756 |
| 2020/0358621 | A1* | 11/2020 | Ngo | | H04L 9/3247 |
| 2022/0158829 | A1* | 5/2022 | Parkhill | | H04L 63/045 |

OTHER PUBLICATIONS

"MD5", Jun. 5, 2019, downloaded from https://web.archive.org/web/20190605225357/https://en.wikipedia.org/wiki/MD5.

European Patent Office, Extended European Search Report for corresponding EP Patent Application No. 21020254.5, Sep. 16, 2021.

McKeown et al., "Sub-file Hashing Strategies for Fast Contraband Detection", IEEE International Conference on Cyber Security and Protection of Digital Services, Jun. 11, 2018, pp. 1-7.

* cited by examiner

SYSTEM AND METHOD FOR IDENTIFYING FILES BASED ON HASH VALUES

TECHNICAL FIELD

The following relates generally to digital forensics, and more particularly to systems and methods for identifying file matches by file size and hash values.

INTRODUCTION

Digital forensics often deals with users who may attempt to hide, delete, or obfuscate data on their devices so that it will not be readily accessible to someone else. In particular, these users may have undertaken illegal activity of which investigators are trying to find proof requiring systems and methods for identifying evidence of data and/or files on the devices of these users.

Traditional methods of identifying files of interest include using hash values to identify the files. Various cryptographic hash algorithms generate fingerprints of files and do a hash value comparison of those files to a source file. Creating the hash values for a file set of a device can be a lengthy process, especially if some of the files are large. However, a single byte difference in file size from the source file would result in a hash value mismatch. Therefore, generating hash values for files of all sizes is both time consuming and unnecessary. In time-sensitive situations, such as cases of child exploitation, human trafficking, or terrorism a more efficient method of identifying files is required.

In other contexts, corporate computer networks can be experience data breaches and breaches of network security which lead to the presence of malicious files (e.g. malware) on one or more computers of the network. These networks can be large and include numerous computers (e.g. hundreds). Scanning such networks to identify and remove the malicious files can involve scanning a significant amount of data (e.g. terabytes) across the many computers of the network. Such a scanning process performed using existing techniques can be slow, in some cases prohibitively so, due to the significant amount of data that needs to be scanned, which may increase the time required to remedy the breach and increase the number of computers on the network that are exposed.

Accordingly, there is a need for systems and methods of identifying files of interest which filter out files based on size before generating hash values.

SUMMARY

A computer-implemented method of forensically investigating a target dataset including a target file by comparing the target file to a source file is provided. The method includes: performing a preliminary matching operation to determine if a preliminary match between the target file and the source file exists, the preliminary matching operation including performing at least one of: a file size matching operation to determine if a file size match between the target file and the source file exists, including: determining a file size of the target file ("target file size"); and comparing the target file size to a file size of the source file ("source file size"); and a sub-hash matching operation to determine if a sub-hash match between the target file and the source file exists, including: generating a sub-hash value of the target file ("target file sub-hash value"); and comparing the target file sub-hash value to a sub-hash value of the source file ("source file sub-hash value"); wherein the target file sub-hash value and the source file sub-hash value each represent a hashing of a predetermined subset of data in the target file and the source file, respectively, with a first hash function. The method further includes: if the preliminary match is identified, performing a full hash matching operation to determine if a full hash match between the target file and the source file exists. Performing the full hash matching operation includes: generating a full hash value of the target file ("target file full hash value"); and comparing the target file full hash value to a full hash value of the source file ("source file full hash value"); wherein the target file full hash value and the source file full hash value each represent a hashing of the entire data in the target file and the source file, respectively, with a second hash function.

Performing the preliminary matching operation may include performing the file size matching operation and the sub-hash matching operation.

The sub-hash matching operation may be performed only if a file size match is determined by the file size matching operation, and the full hash matching operation may be performed only if a sub-hash match is determined by the sub-hash matching operation.

The method may further include using an appended source file full hash value including the source file size and the source file sub-hash value each appended to the source file full hash value for the file size matching operation, the sub-hash matching operation, and the full hash matching operation.

Performing the preliminary matching operation may include performing the file size matching operation, and, if a file size match is determined by the file size matching operation, the method may further include: performing the sub-hash matching operation if the target file size meets a predetermined sub-hashing size threshold, and performing the full hash matching operation only if a sub-hash match is determined by the sub-hash matching operation; and performing the full-hash matching operation without performing the sub-hash matching operation if the target file size does not meet the predetermined sub-hashing size threshold.

The predetermined subset of data used to generate the target file sub-hash value and the source file sub-hash value may include one or more data blocks, each data block having a predefined reading start location and a predefined block size.

The one or more data blocks may include a plurality of data blocks, and the predefined block size of each of the plurality of data blocks may be the same.

The one or more data blocks may include a plurality of data blocks, and the predefined reading location and the predefined block size of the plurality of data blocks may be defined such that the plurality of data blocks are non-overlapping.

The one or more data blocks may include a first data block and a second data block, and the first data block may be at the start of the file and the second data block may be at the end of the file.

Performing the preliminary matching operation may include performing only the file size matching operation, and the method may further include using an appended source file full hash value including the source file size appended to the source file full hash value for the file size matching operation and the full hash matching operation.

Performing the preliminary matching operation may include performing only the sub-hash matching operation, and the method may further include using an appended source file full hash value including the source file sub-hash value appended to the source file full hash value for the sub-hash matching operation and the full-hash matching operation.

Generating the target file sub-hash value may include retaining only a first retained subset of the hashing of the predetermined subset of data in the target file, the first retained subset of the hashing being the target file sub-hash value used for the comparison of the target file sub-hash value to the source file sub-hash value, and the source file sub-hash value used for the comparison to the target file sub-hash value may be a second retained subset of the hashing of the predetermined subset of data in the source file, the first and second retained subsets being a same subset of the respective hashing.

Comparing the target file sub-hash value to the source file sub-hash value may include comparing only a subset of the hashing of the predetermined subset of data in the target file to a same subset of the hashing of the predetermined subset of data in the source file.

The method may further include generating an electronic file match record upon determining a full hash match between the target file and the source file and displaying the electronic file match record in a user interface.

The first hash function and the second hash function may be the same hash function, and the hash function may be a cryptographic hash algorithm.

A computer system for forensically investigating a target dataset including a target file by comparing the target file to a source file is provided. The computer system includes a processor and a memory in communication with the processor. The memory stores computer-executable instructions which when executed by the processor cause the computer system to: perform a preliminary matching operation to determine if a preliminary match between the target file and the source file exists, the preliminary matching operation including performing at least one of: a file size matching operation to determine if a file size match between the target file and the source file exists, including: determining a file size of the target file ("target file size"); and comparing the target file size to a file size of the source file ("source file size"); and a sub-hash matching operation to determine if a sub-hash match between the target file and the source file exists, including: generating a sub-hash value of the target file ("target file sub-hash value"); and comparing the target file sub-hash value to a sub-hash value of the source file ("source file sub-hash value"); wherein the target file sub-hash value and the source file sub-hash value each represent a hashing of a predetermined subset of data in the target file and the source file, respectively, with the same hash function; and if the preliminary match is identified, perform a full hash matching operation to determine if a full hash match between the target file and the source file exists, wherein performing the full hash matching operation includes: generating a full hash value of the target file ("target file full hash value"); and comparing the target file full hash value to a full hash value of the source file ("source file full hash value"); wherein the target file full hash value and the source file full hash value each represent a hashing of the entire data in the target file and the source file, respectively, with the same hash function.

Performing the preliminary matching operation may include performing the file size matching operation and the sub-hash matching operation. The sub-hash matching operation may be performed only if a file size match is determined by the file size matching operation, and the full hash matching operation may be performed only if a sub-hash match is determined by the sub-hash matching operation.

Performing the preliminary matching operation may include performing the file size matching operation, and, if a file size match is determined by the file size matching operation, the processor may be configured to: perform the sub-hash matching operation if the target file size meets a predetermined sub-hashing size threshold, and perform the full hash matching operation only if a sub-hash match is determined by the sub-hash matching operation; and perform the full-hash matching operation without performing the sub-hash matching operation if the target file size does not meet the predetermined sub-hashing size threshold.

The predetermined subset of data used to generate the target file sub-hash value and the source file sub-hash value may include one or more data blocks, each data block having a predefined reading start location and a predefined block size.

Generating the target file sub-hash value may include retaining only a first retained subset of the hashing of the predetermined subset of data in the target file, the retained subset of the hashing being the target file sub-hash value used for the comparison of the target file sub-hash value to the source file sub-hash value, and the source file sub-hash value used for the comparison to the target file sub-hash value may be a second retained subset of the hashing of the predetermined subset of data in the source file, the first and second retained subsets being a same subset of the respective hashing.

A computer-implemented method of forensically investigating a target dataset including a target file by comparing the target file to a source file is provided. The method includes: determining a file size of the target file ("target file size"); comparing the target file size to a file size of the source file ("source file size") to identify a file size match between the target file and the source file; if the file size match is identified: generating a sub-hash value of the target file ("target file sub-hash value"); comparing the target file sub-hash value to a sub-hash value of the source file ("source file sub-hash value") to identify a sub-hash match between the target file and the source file; wherein the target file sub-hash value and the source file sub-hash value each represent a hashing of a predetermined subset of data in the target file and the source file, respectively, with a first hash function; and if the sub-hash match is identified: generating a full hash value of the target file ("target file full hash value"); and comparing the target file full hash value to a full hash value of the source file ("source file full hash value") to identify a full hash match between the target file and the source file.

The first and second hash functions may be the same hash function.

The first and/or second hash function may be a cryptographic hash algorithm.

A computer-implemented method of generating a source file sub-hash value for use in a forensic investigation of a target dataset including a target file through comparison to a sub-hash value of the target file is provided. The method includes: reading a plurality of data blocks of the source file to obtain a subset of data from the source file, each data block having a predefined reading start location and a predefined block size; calculating, using a cryptographic hash algorithm, a single hash value for the source file using the subset of data from the source file as input, the single hash value being the sub-hash value; and linking the sub-hash value to a source file identifier of the source file.

The method may further include retaining only a subset of the calculated single hash value as the sub-hash value.

The method may further include appending the sub-hash value to a full hash value of the same source file, the full hash value calculated using the entire data from the source file.

A computer-implemented method of generating a loaded hash set for use in a forensic investigation of a target dataset including a target file, the loaded hash set for acting as a reference against which the target file can be compared, is also provided. The method includes: generating a sub-hash value of the source file by calculating a first hash value using a subset of data in the source file as input, the first hash value being the sub-hash value; generating a full hash value of the source file by calculating a second hash value using the entire data in the source file as input, the second hash value being the full hash value; and linking a file size of the source file, the sub-hash value, and the full hash value together in the loaded hash set, wherein the file size, the sub-hash value, and the full hash value are for use in a file size matching operation, a sub-hash matching operation, and a full-hash matching operation, respectively.

Linking the file size, the sub-hash value, and the full-hash value may include appending the file size and the sub-hash value to the full hash value.

The subset of data in the source file may include one or more data blocks each having a predefined reading start location and a predefined block size, and the predefined reading start location and the predefined block size may be used in generating the sub-hash value.

A method of identifying target device file matches of a source file based on file size and hash values is provided. The method includes: scanning a target file dataset comprising N target files, where N is an integer greater than 0, wherein the target file dataset is on a target device, and wherein scanning includes: determining a respective file size for each of the N target files in the target dataset; and determining whether each of the N target files is a size-matching target file, wherein a size-matching target file is any target file of the N target files that matches a first source file size of the source file; and generating a respective target file hash value for each size-matching target file by applying a hash function to each size-matching target file; and comparing a first source file hash value to the respective target file hash value of each size-matching target file to determine if each size-matching target file matches the first source file, the first source file hash value having been generated by applying the hash function to the first source file.

The method may further include generating the first source file hash value for the first source file using the hash function.

The hash function may be a cryptographic hash algorithm.

The hash function may be selected from the group consisting of is a MD5 hash function, a SHA-1 hash function, a SHA-256 hash function, a SHA-512 hash function, and a SHA-1024 hash function.

The method may further include acquiring the first source file hash value.

The method may further include: storing at least a second source file hash value of at least a second source file; appending at least a second source file size to the at least a second source file hash value to generate at least a second appended source file hash value; and scanning the target file dataset to determine if a match for the at least a second source file is present in the target file dataset.

The identifying target device file matches of the first source file and the at least a second source file may be simultaneous.

The target file dataset may be stored on a target device which includes a data storage element for storing the first target file dataset.

The target file data set may be scanned on the target device.

The method may be performed by at least one investigator device.

The target file dataset may be transferred to the at least one investigator device.

Each size-matching target file may be transferred to the at least one investigator device configured to generate the target file hash values.

The at least one investigator computing device may generate the target file hash values of each size-matching target file without transferring the target files from the target device to the at least one investigator device.

The at least one investigator device may access the target dataset of the target device wirelessly.

The at least one investigator device may access the target dataset of target device by a wired connection.

The target device may be a desktop computer, a laptop computer, a mobile device, or an external hard drive.

The method may further include storing an appended source file hash value dataset including appended source file hash values for a plurality of source files including the first source file.

Comparing the target file hash value of each size-matching target file with the first source file hash may be performed automatically by at least one investigator device.

Comparing the target file hash value of each size-matching target file with the first source file hash value may be performed manually by a human.

Comparing the target file hash value of each size-matching target file with the first source file hash value may further include comparing the target file hash value of each size-matching target file with the first source file hash value by a bloom filter.

The first source file may be a file fragment.

The first source file may be a complete file.

The method may further include flagging matches.

The method of claim 1 may further include displaying flagged matches on a user interface of an investigator device.

The method of claim may further include automatically generating a case summary record for the scan.

The method may further include automatically generating a match record for each match instance.

The method may further include automatically populating the match record with match data.

The match record may be generated only when a match is identified.

The method may further include generating a match notification indicating a match has been identified.

The method may further include acquiring identification information of the target device and storing it on an investigator device.

The method may further include when a match is identified, automatically generating a case file and automatically populating the case file with the identification information of the target device.

The identification information may include any one or more of the target file, target file metadata, target device metadata, and target device owner data.

The method may further include appending the first source file size to the first source file hash value to generate a first appended source file hash value A system for identifying file matches of source files based on hash values is provided. The system includes a target device including a memory storing a target file dataset including N target files, where N is an integer greater than 0. The system also includes an investigator device including a processor communicatively coupled to a memory. The investigator device is configured to: store in the memory a first source file hash value and a first source file size of the first source file, wherein the first source file hash value was generated by applying a hash function to the first source file; establish a communicative connection to the target device to enable access to the target file dataset by the investigator device; scan the target file dataset, wherein the scanning includes: determining a respective file size for each of the N target files in the target dataset; determining whether each of the N target files is a size-matching target file, wherein a size-matching target file is any target file in the N target files that matches the first source file size; and generate a respective target file hash value for each size-matching target file by applying the hash function to each size-matching target file; and compare the first source file hash value to the respective target file hash value of each size-matching target file to determine if each size-matching target file matches the first source file.

The investigator device may be configured to append the first source file size to the first source file hash value to generate a first appended source file hash value.

The investigator device may be further configured to transfer the target file dataset to the investigator device via the communicative connection.

The communicative connection between the investigator device and the target device may be wireless.

The communicative connection between the investigator device and the target device may be wired.

The investigator device may be a single computing device.

The investigator device may be a plurality of computing devices.

The investigator device may include a client investigator device in communication with a server investigator device. The client investigator device may be connected to the target device.

An investigator device for identifying file matches of source files based on hash values is provided. The device includes a memory for storing a first source file hash value of a first source file and a first appended source file hash value of the first source file. The first appended source file hash value comprises the first source file hash value and a first source file size appended to the first source file hash value. The first source file hash value is generated by applying a hash function to the first source file. The device also includes a processor in communication with the memory. The processor is configured to establish a communicative connection to a target device to enable data transfer between the target device and the investigator device. The processor is further configured to scan a target file dataset including N of target files, where N is an integer greater than 0. The scanning includes determining a respective file size for each of the N target files in the target dataset and determining whether each of the N target files is a size-matching target file, wherein a size-matching target file is any target file in the N target files that matches the first source file size in the first appended source file hash value. The processor is further configured to generate respective target file hash values for each size-matching target file, the respective target file hash values generated by applying the hash function to each size-matching target file and compare the target file hash values with the first source file hash value to determine if each size-matching target file matches the first source file.

The processor may be further configured to append the first source file size to the first source file hash value to generate the appended first source file hash value.

The investigator device may be further configured to identify file matches of at least a second source file.

The investigator device may be further configured to identify file matches of the first source file and the at least a second source file simultaneously.

The investigator device may comprise a single computing device.

The investigator device may comprise a plurality of computing devices.

The investigator device may establish a wireless communicative connection to the target device.

The investigator device may establish a wired communicative connection to the target device.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
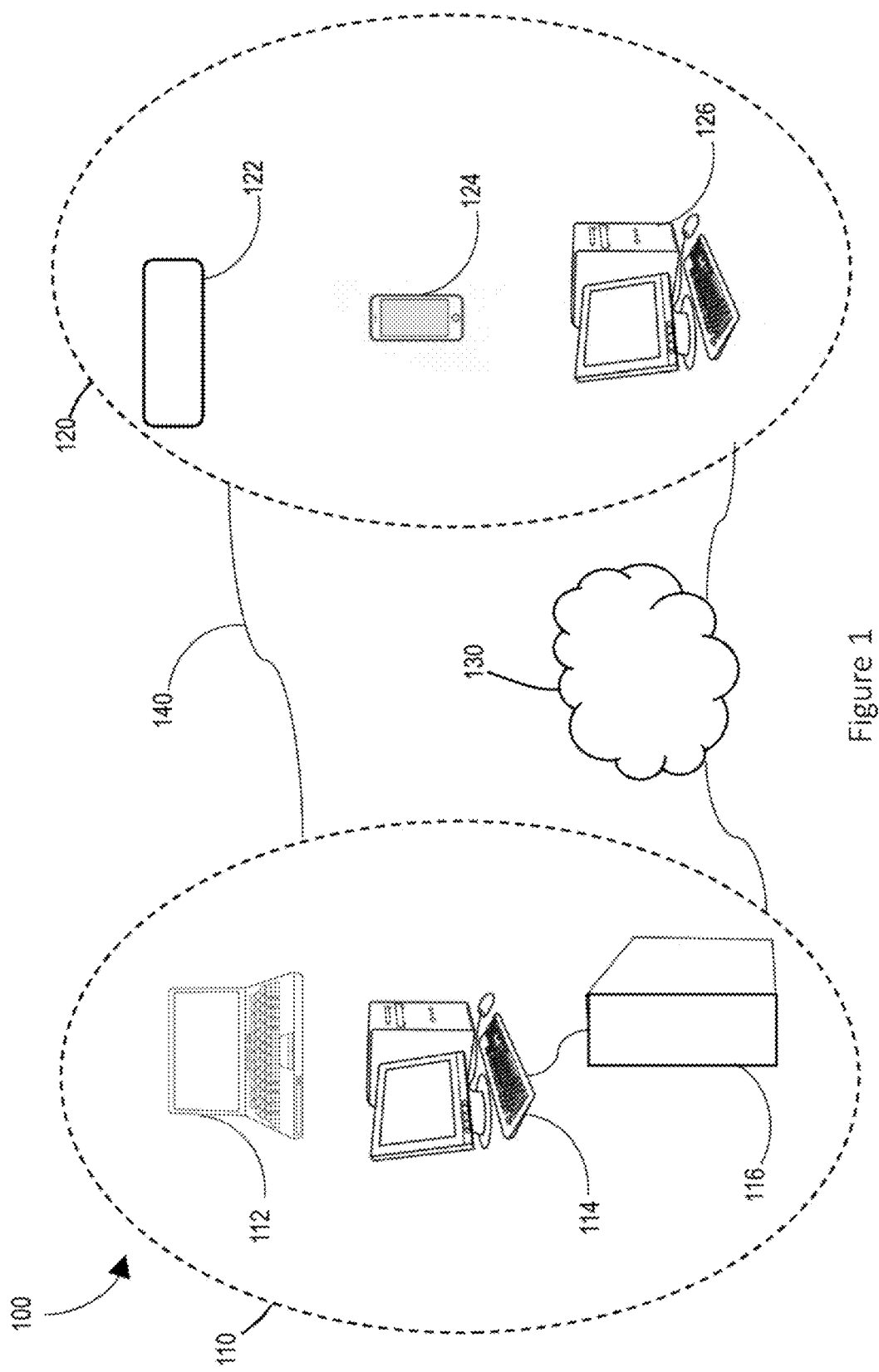
FIG. 1 is a schematic diagram of a system for identifying source file matches on a target device based on file size and hash values, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

In a digital forensics workflow it is advantageous to create hash values for files of interest on the device of a suspect to compare to a hash value of a source file (known file of interest) to decrease the amount of time it takes to search for incriminating files on the device. However, under some circumstances even this process can take too long.

For example, when a terrorist threat is suspected at a large event, it may be advantageous to be able to quickly search phones for known identifiers of the suspected terrorist organization. Or when a suspect can only be held for a short amount of time it may be advantageous to be able to quickly search their laptop.

The systems and methods described herein may be used as an intuitive preview tool that quickly scans smartphones and computers to determine if there is illicit material present and to develop a risk profile of the target user. It is ideal for offender management, or execution of search warrants. For example, parole officers need to inspect a sex offender's devices to make sure that they are not violating the terms of their release. The systems and methods empower parole officers, or any other non-technical user, to create a more accurate risk assessment of offenders by performing an extremely fast scan of their computers, hard drives, USB drives, as well as Android & iOS devices, looking for objectionable material or data.

Known encryption, dark web, peer-to-peer, cryptocurrency, cloud storage apps, anti-forensics tools, virtual machines may be identified using the systems and methods herein.

The present systems and methods may be used to quickly scan smartphones and computers to determine if illicit material is present—often identifying it in five minutes or less. From there, a risk profile of the target user can be quickly developed. This reduces demand on digital forensic units by limiting the number of seized devices and prioritizing those that require urgent full forensic analysis—decreasing the timeframe between arrest and charge.

For example, Child Exploitation investigators need the fastest tools in their arsenal to be able to locate illegal material and get to the evidence as quickly as possible. Fast triaging on-scene can help them determine which devices to seize for a forensic examination. That can be important in cases such as executing a search warrant at a suspect's home or determining if a paroled offender has breached their release conditions.

The present disclosure provides systems and methods for identifying file matches between a target file and a source file, where the source file acts as a reference for the comparison. The systems and methods of the present disclosure use a preliminary matching operation to determine whether a preliminary match between the target file and the source file exists. If a preliminary match exists between the target file and the source file, only then is a hash value calculated using the entire contents of the file (a "full hash value") and the full hash values of the target file and the source file compared (full hash matching operation). The preliminary matching operation may include a file size comparison, a sub-hash comparison, or both a file size comparison and a sub-hash comparison between the target file and the source file. In cases where both a file size comparison and a sub-hash comparison are performed as part of the preliminary matching operation, the file size comparison may be performed first, and the sub-hash comparison performed only if the file size comparison indicates there is a file size match. The preliminary matching operation of a file is generally less computationally intensive than performing a full hash matching operation of the same file. The preliminary matching operation is intended to reduce the number of files in a target dataset that are fully hashed, thus improving speed of the investigation and reducing computational resources required. The full hash matching operation, performed only after the preliminary matching operation is successful, is used to perform the final determination of whether the target file is a match for the source file, thus providing forensic validity.

Referring to FIG. 1, illustrated therein, is a schematic diagram of a system 100 for identifying source file (or "reference file") matches on a target device based on file size and hash values, according to an embodiment. Generally, a source file is a file whose presence on a target device (as a target file) can be used as an indicator of forensically relevant activity on the part of the target device owner or user (e.g. activity that is suspicious, illicit, criminal, unauthorized etc.). The source file, when present on the target device, is referred to generally as a target file (as part of a target file dataset) that matches the source file. As such, the source file (and various data about the source file such as size, full hash, sub-hash) may act as a reference to which a target file can be compared to identify whether the target file matches the source file and is thus present on the target device.

The system includes at least one investigator device 110 connected to a target device 120. Various investigator devices and target devices are shown.

Investigator device 110 may include at least one computing device including a laptop computer, a desktop computer, a server platform, or any other combination of computing devices capable of executing the instructions for identifying source file matches on a target device by first scanning target device files for file size matches and then generating hash values for size-matching target device file and comparing those hash values to a hash value for the source file.

Investigator device 110 may comprise a client investigator device in communication with a server investigator device, wherein the client investigator device is communicatively connected to the target device.

The investigator device 110 may be powered by an operating system such as Windows 10, Android, iOS, or the like.

Examples of a investigator device shown are a laptop computer 112 and a desktop computer 114 connected to a server platform 116. In various embodiments, the investigator device 110 may establish a communicative connection to the target device by a wireless connection via a network 130 or by a wired connection 140. The wired connection 140 may be a data transfer cable, such as a USB cable.

The target device 120 may be any computing device capable of storing files or file fragments. The target device 120 may be a seized device (e.g. seized from a suspect).

Examples of a target device shown are an external hard-drive 122, a mobile phone 124, and a desktop computer 126. In other cases, the target device may be a cloud computer, such as a cloud server.

These investigator devices and target devices represent various embodiments of systems for identifying files on the target devices which match a source file of interest (or reference file). That is, a single investigator device or multiple investigator device may be directly or indirectly connected to target devices to scan a target device dataset for source file matches based on hash values, wherein at least one investigator device in each embodiment is configured to generate hash values and at least one investigator device in each embodiment is configured to compare hash values of source files to hash values of target device files. In all embodiments, at least one investigator device scans the target device files to screen for only those files which have the same file size as a source file(s) of interest and only generates hash values for comparison for those target device files which have the same file size as the source file(s) of interest.

The target device dataset or a subset of data from the dataset may be transferred between the target device 120 and the investigator device 110 via the wired connection 140 or via a wireless connection such as network 130.

While FIG. 1 shows an embodiment in which the investigator device 110 connects to the target device 120, other variations are contemplated. In an embodiment, the target device 120 may include a software tool running on the target device 120 and implementing one or more methods described herein. The investigator may, for example, connect a USB device to the target device 120 and run the tool on the hard drive of the target device 120. In such an embodiment, it can be considered that the target device includes the investigator device 110 or a component thereof as the functionalities of the investigator device 110 may be operating or executing on the target device 120 itself. In another embodiment, a hard drive of the target device 120 may be removed from the target device 120 and connected to the investigator device 110. In another embodiment, a copy of the hard drive of the target device 120 (e.g. a forensic image of the drive) may be analyzed by the target device 120. In another embodiment, the investigator device 110 may include a cloud computing component which may perform processing including one or more steps of the methods described herein. The investigator device 100 may include a client device running a client component for interacting with the cloud component. In an example, data may be collected from an enterprise endpoint, extracted, and processed in the cloud by the investigator device 110. Generally, the one or more software components implementing the methods for identifying file matches described herein may run on the investigator device 110, on the target device 120, or on a copy of data from the target device 120.

The target device dataset may include media files such as an image file, video file, or audio file. The target device dataset may include text files. The target device files may contain information that is relevant or potentially relevant to an alleged or planned crime or other incident. The media file may be captured, for example, by a frontline officer or investigator using the investigator device 110 or by a witness, victim, or other individual.

The system 100 may automatically produce a standardized evidence report on any digital evidence collected from the target device. The report may have a standardized format. In some cases, the standardized format may be designed to meet certain legal or evidentiary requirements. For example, in order for the evidence collected to be admissible, the evidence may need to meet certain requirements or be collected or presented in a particular way. By generating a report in a standardized format that meets one or more such requirements, the report can be shared with prosecuting attorneys in a format that is most effective or useful.

The investigator device 110 may be a purpose-built machine designed specifically for collecting and reporting on digital evidence. The investigator device 110 stores and runs a digital investigation application including computer-executable instructions that, when executed by a processor, cause the investigator device to capture and report on digital evidence.

The investigator device 110 may be controlled and operated by a frontline police officer, investigator, or the like. For example, investigator device 110 may be stored in a police cruiser for use by an officer in the field.

In other embodiments the system 100 may include a storage device to store data from the target device 120. The storage device may be a USB storage device. The target device files can be transferred to the storage device by connecting the storage device to the target device wirelessly or via a wired connection.

In other embodiments, the storage device may be any suitable type of storage device capable of receiving and storing data transferred from the target device 120.

The target device data captured by the system 100 may be stored in an existing digital evidence management system, records management system (RMS), or the like.

As discussed above, the investigator device 110 may include at least one server computer, desktop computer, notebook computer, tablet, PDA, smartphone, or another computing device. The investigator device 110 may include a connection with the network 130 such as a wired or wireless connection to the Internet. In some cases, the network 130 may include other types of computer or telecommunication networks (e.g. Bluetooth, LoRa, NFC, etc.).

The investigator device 110 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 130.

The investigator device 110 will include an input device. The input device may include any device for entering information into investigator device 110. For example, input device may be a keyboard, keypad, cursor-control device, touchscreen, camera, digital pen, stylus, or microphone.

A display device of the investigator device 110 may include any type of device for presenting visual information. For example, display device may be a computer monitor, a flat-screen display, a projector or a display panel.

An output device of the investigator device 110 may include any type of device for presenting a hard copy of information, such as a printer for example. Output device may also include other types of output devices such as speakers, for example.

In some embodiments, investigator device 110 may include multiple of any one or more of processors, applications, software modules, second storage devices, network connections, input devices, output devices, and display devices.

Although investigator device 110 is described with various components, one skilled in the art will appreciate that the investigator device 110 may in some cases contain fewer, additional or different components. In addition, although aspects of an implementation of the investigator device 110 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the investigator device 110 and/or processor to perform a particular method.

Investigator device 110 can be described performing certain acts. It will be appreciated that any one or more of the embodiments of investigator device 110 may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

The system 100 may enable officers to effectively collect the evidence they need to help victims of crimes or to prosecute perpetrators of crimes. The system 100 may help secure key evidence such as by quickly capturing and preserving evidence. The system 100 allows a user to obtain evidence when it is available to collect information needed to help investigations.

In another example, the system 100 may be used in a corporate network or data security context. A corporate network may suffer a security breach resulting in the presence of malware on the network. The investigator device 110 may be used to hash the malware files. In other cases, hashes of the malware files may be provided to the investigator device 110. The investigator device 110 may determine or have provided the file sizes for the malware files. The investigator device 110 appends the file size to the hash value for a respective file. The investigator device 110 may then scan the network using the hash value with appended size file for the malware file or files. A particular advantage of this process is that the investigator device 110 does not have to read the data but instead can perform a method of identifying file matches using the hash values and file sizes for the malware files. This may allow for the investigator device 110 to scan through considerable amounts of data across multiple, and in some cases many, computers that are part of the network.

Figure 2:
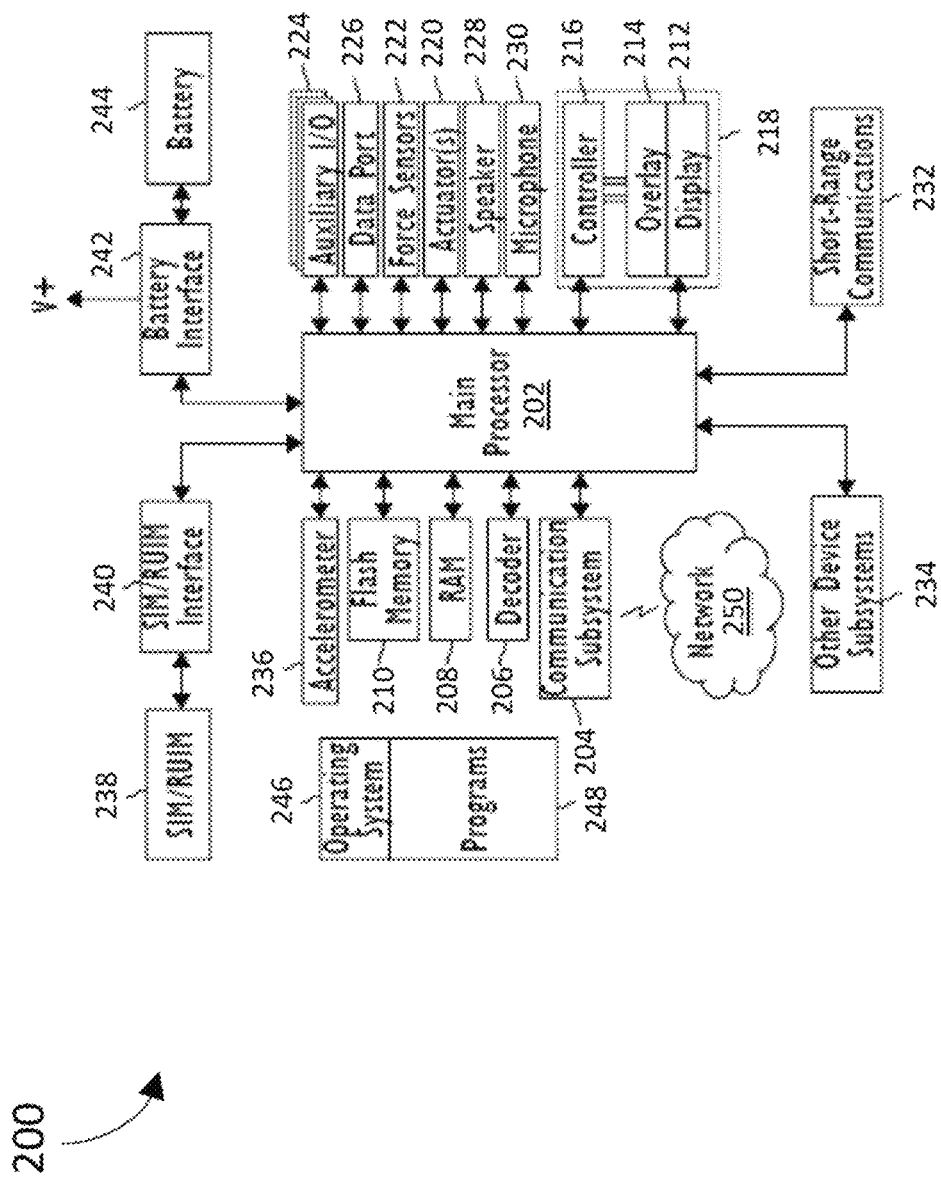
FIG. 2 is a block diagram of a computing device of FIG. 1, according to an embodiment.

FIG. 2 shows a simplified block diagram of components of a device 200, such as a mobile device or portable electronic device. The device 200 may be for example any of the devices of FIG. 1. The device 200 includes multiple components such as a processor 202 that controls the operations of the device 200. Communication functions, including data communications, voice communications, or both may be performed through a communication subsystem 204. Data received by the device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for receiving one or more rechargeable batteries 244.

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the portable electronic device 200 may be similar. The speaker 228 may output audible information converted from electrical signals, and the microphone 230 may convert audible information into electrical signals for processing.

Figure 3:
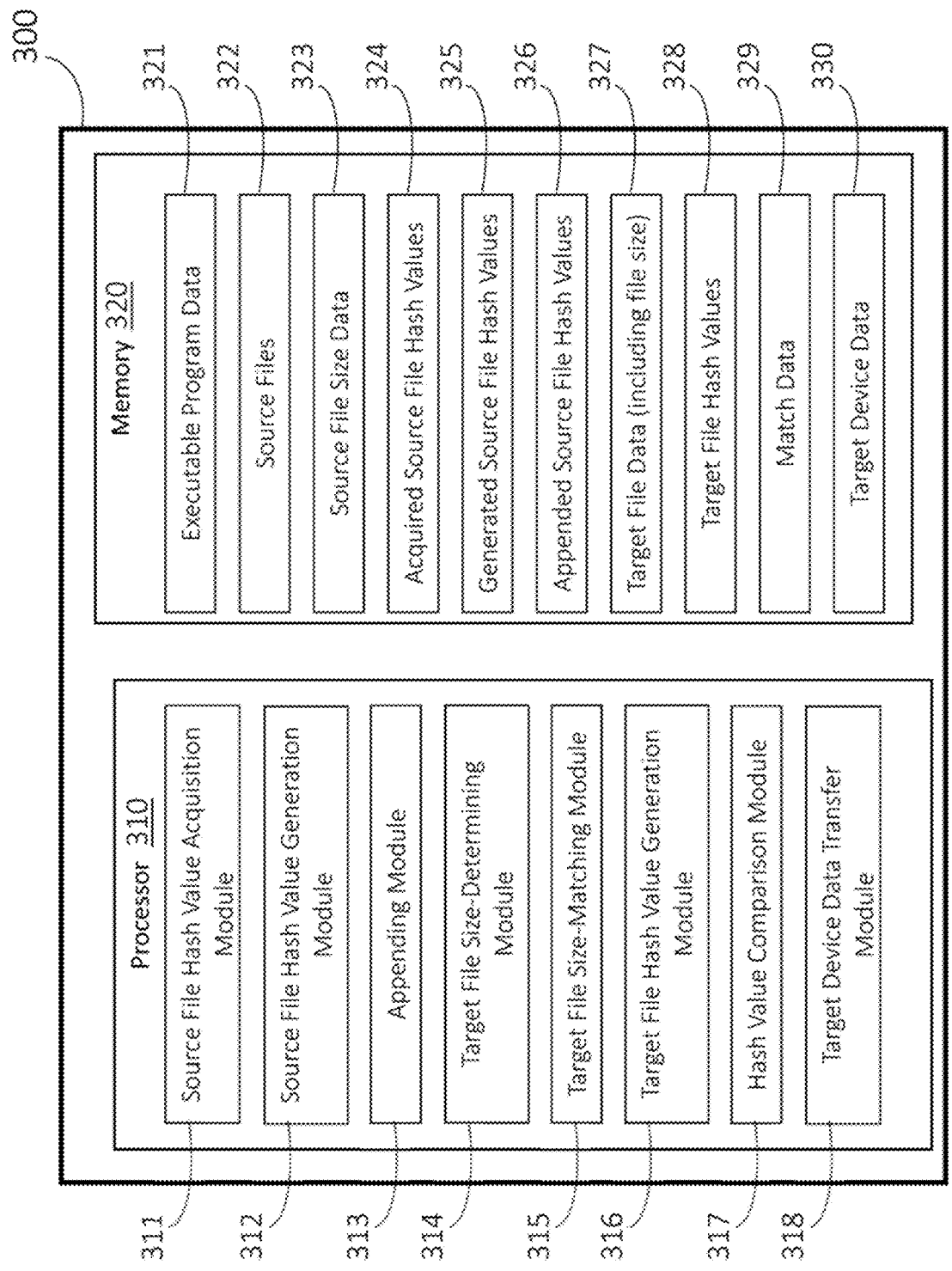
FIG. 3 is a block diagram of an investigator device for identifying source file matches on a target device based on file size and hash values, according to an embodiment.

FIG. 3 is a block diagram of an investigator device 300 for identifying source file matches on a target device based on file size and hash values, according to an embodiment.

The investigator device 300 includes a processor 310 and a memory 320. The processor 310 is communicatively connected to the memory 320. Investigator device 300 includes other components beyond processor 310 and memory 320, including an input device (e.g. a keyboard), a display (with a user interface), and an output device.

Memory 320 has instructions stored thereon which, upon execution by the processor 310, cause examiner device 300 to perform the functions of methods or processes discussed herein. Processor 310 may include more modules and memory 320 may include more data than described herein.

In other embodiments the investigator device may comprise multiple computing devices and/or multiple processors.

The processor 310 includes a source file hash value acquisition module 311, a source file hash value generation module 312, an appending module 313, a target file size-determining module 314, a target file size-matching module 315, a target file hash value generation module 316, a hash value comparison module 317, and a target device data transfer module 318.

The memory stores executable program data 321, source file(s) 322, source file size data 323, acquired source file hash values 324, generated source file hash values 325, appended source file hash values 326, target file data 327, target file hash values 328, match data 329, and target device data 330.

A hash value (also hash code, hash) is a fixed-digit numeric representation of data. That is, a hash value of the same length can be generated for data of any size. A hash value can be generated for a file or a file fragment of any kind. Identical files will have identical hash values. Non-identical files will have non-identical hash values. One of the components of a hash value is file size, therefore, files of a different size will never have identical hash values. This allows for pre-screening of target files (files of interest on a target device of an individual or organization of interest) by size before generating hash values to search for matches between target files and a source file of interest. Target files that have identical sizes to a source file of interest will be a subset of the total amount of target files. Generating and comparing hash values of only size-matching target files will be quicker than the same process for all the target files.

The investigator device 300 may perform the methods and processes described herein automatically upon establishing a connection between the investigator device 300 and a target device or each module may be manually prompted by a human investigator. The investigator device 300 may function as follows.

The investigator device 300 may perform file match searches for a source files for one source file at a time or may perform file match searches for multiple source files simultaneously. That is, a first file match search may be performed for a first source file having a first source file hash value and a first appended source file hash value, and then perform a second file match search for a second source file having a second source file hash value and a second appended source file hash value at a later time. Or, a file match search may be performed for the first source file and at least the second source file simultaneously.

It is to be understood that, herein, any reference to a singular or plural source file, source file hash value, appended source file hash value, target file, size-matching target file, or target file hash values is solely for illustrative purposes and that a singularity or plurality of any of the above may be present in various embodiments.

The source file hash value acquisition module 311 acquires source file hash values from a third party. The third party may be any device capable of storing hash values. A single source file hash value may be transferred to the investigator device 300 or multiple source file hash values may be transferred at one time. The source file hash values may exist in a database of source file hash values, and the entire database may be transferred.

After source file hash values are acquired, the source file hash values are stored in the memory 320 as the acquired source file hash values 324.

Source files 322 may be stored in memory 320. These source files 322 may represent source files which are transferred to the investigator device 300 along with respective acquired source file hash values 324 or source files may be transferred to the investigator device 300 without an accompanying source file hash value. Source files 322 may be file fragments or complete files.

File size data 323 may be transferred to the investigator device along with acquired source file hash values 324 or source files 322 and stored in memory 320. File size data may need to be extrapolated from acquired source file hash values 324 or source files 322 by the investigator device and stored as file size data 323 in memory 320.

The investigator device 300 may acquire some source files 322 which do not have respective acquired source file hash values. The source file hash value generation module 312 generates generated source file hash values 325 for the source files with no acquired source file hash values. The investigator device 300 uses a hash function or other method of creating hash values to generate generated source file hash values 325. The generated source file hash values 325 are stored in memory 320. File size data 323 for source files 322 with generated source file hash values 325 are also stored in memory 320.

The source file hash value generation module 312 may employ a cryptographic hash algorithm such as MD5, SHA-1, SHA-256, SHA-512, or SHA-1024 as the hash function to create MD5, SHA-1, SHA-256, SHA-512, or SHA-1024 hash values respectively. As an example, MD5 may provide speed advantages while still providing sufficient uniqueness for the methods of the present disclosure. The specific hash function algorithm used may depend on the context of the search. That is, the investigator may wish to use a hash function algorithm which creates hash values in the least amount of time (shorter hash values) while maintaining an appropriate level of specificity for the file(s) of interest.

The appending module 313 appends file size data 323 to both acquired source file hash values 324 and generated source file hash values 325 to created appended source file hash values 326 which are stored in memory 320.

The target file size-determining module 314 scans the target device to find at least one target file dataset comprising N target files, where N is an integer greater than 0. Target file size-determining module 314 determines a file size for each of the N target files. In some embodiments the target file dataset may be transferred to the investigator device before determining a file size for each of the N target files. Transferred target files are stored in memory 320 as target device data 330. In some embodiments file size for each of the N target files is determined while the N target files remain on the target device.

The target file size-matching module 315 determines is the file size of each of the N target files matches an appended source file hash value 326. The investigator device 300 may search for target file matches for a single source file or may search for target matches for multiple source files simultaneously. The target file size-matching module 315 uses the appended file size of an appended source file hash value to search for size-matching target files.

In some embodiments, the target file size-determining module 314 and the target file size-matching module 315 may be the same module.

In some embodiments, data regarding all of the N target files may be stored in the memory 320 as target file data 327, while in other embodiments only data regarding size-matching target files may be stored in the memory 327. Target file data 327 may include file type, file size, file location, etc.

The target file hash value generation module 316 generates target file hash values 328 for each of the N target files that is a size-matching target file. The investigator device 300 uses a hash function or other method of creating hash values to generate target file hash values 328. The target file hash values 328 are stored in memory 320.

The target file hash value generation module 316 and the source file hash value generation module 312 may be the same module.

The hash value comparison module 317 compares appended source file hash values 326 (or in other embodiments acquired source file hash values 324 or generated source file hash values 325) to target file hash values 328 to find target file matches of a source file. Target file matches are stored as match data 329 in memory 320.

The hash value comparison module 317 may display the appended source file hash values 326 and the target file hash values 328 on a user interface for manual comparison by a human.

The hash value comparison module 317 may employ a bloom filter to compare the appended source file hash values 326 and the target file hash values 328.

Matches between target files and the source file may be flagged and displayed on a user interface of the investigator device 300.

The target device data transfer module 318 transfers data from the target device to the investigator device 300. This data may be target file data 327 (data regarding the target files), complete target files or file fragments, an entire target file dataset, etc. This data may also be target device data 330 including metadata regarding the target device, device identification information, device user or owner identification information, logs, or any other relevant information to an investigation. This data transfer may occur at any point after a connection is established between the investigator device 300 and the target device. A case file for a search may be automatically generated and populated with target device data 330.

The investigator device 300 may further include a module for establishing a connection with the target device either wirelessly or through a wired connection (e.g. a usb connection).

The investigator device 300 may further include a decryption module or similar module for accessing data or files on the target device which have been hidden or protected.

The investigator device 300 may further include a module for creating reports or records on searches and file matches and/or for sending information on matches to another party. A case summary record for each search performed by the investigator device 300 may be generated at any point during the search. A match record may be generated for each search or may only be generated is a search finds a match. The match record may be added to the case summary record. The match record and case summary record may be automatically populated. A match notification may be generated when a match is found.

The investigator device 300 may further include a module for choosing which drives of target file dataset to search on the target device.

Figure 4:
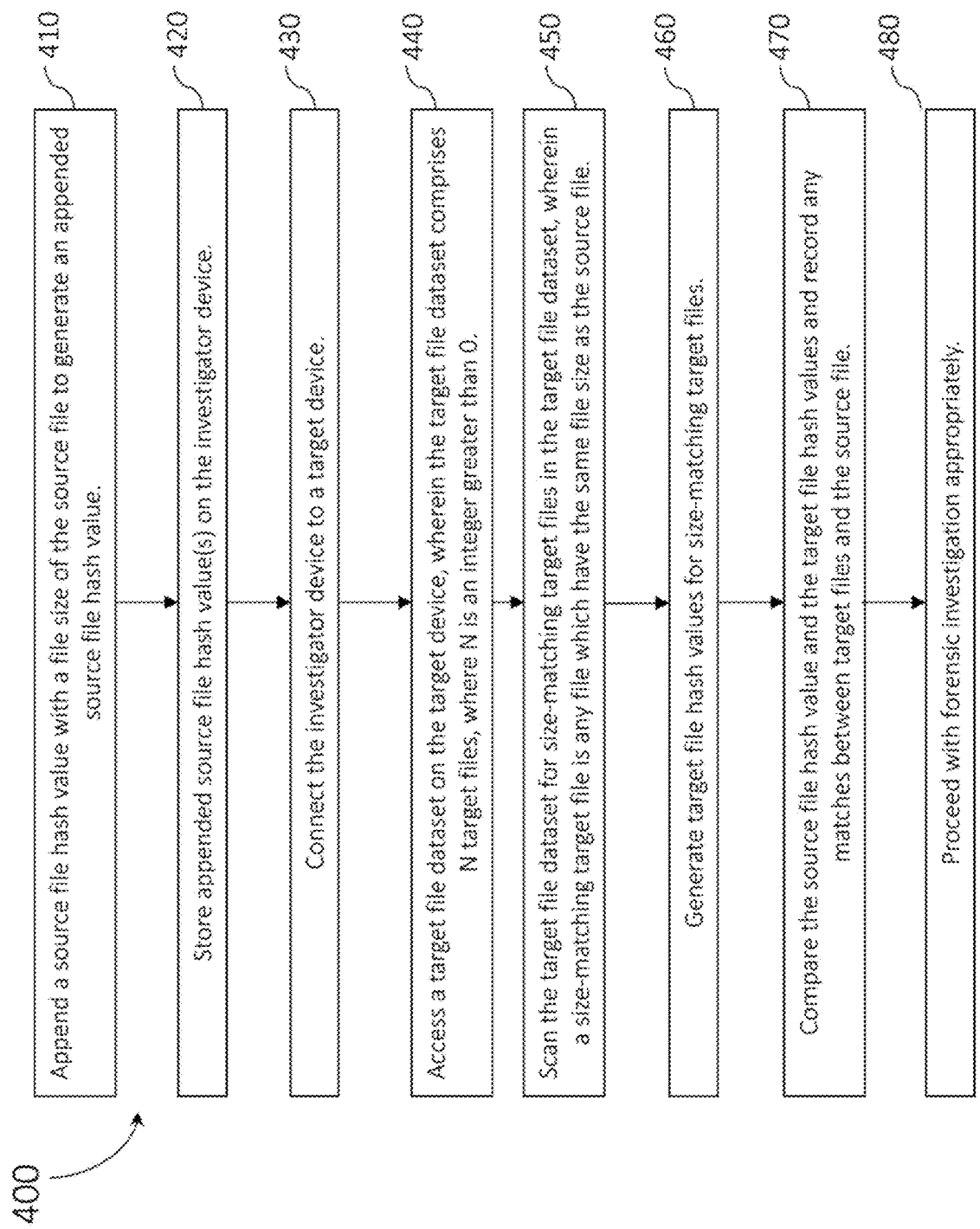
FIG. 4 is a flow diagram of a method of identifying source file matches on a target device based on file size and hash values, according to an embodiment.

FIG. 4 is a flow diagram of a method 400 of identifying source file matches on a target device based on file size and hash values, according to an embodiment. Method 400 represents a core, general method for identifying matches based on hash values. Method 500 of FIG. 5 and method 600 of FIG. 6 add more specifics to method 400.

Method 400 refers to a single investigator device, however, it is to be understood that the investigator device may include multiple computing devices and various steps or storage of data/information may occur on or be performed by one or more of the computing devices of the investigator device.

At 410, a source file hash value is appended with a file size of the source file by an investigator device to generate an appended source file hash value. The source file hash value may be acquired from a database, storage device, or other computing device that contained the source file hash value or multiple source file hash values. The source file hash value may be generated by the investigator device by a hash function or other method of creating a hash value.

The investigator device may generate a single appended source file hash value or multiple appended source file hash values. Method 400 continues below for a single appended source file hash value, but it is to be understood that the method may occur for multiple appended source file hash values simultaneously.

At 420, the appended source file hash value is stored on the investigator device. That is the appended source file hash value is stored in a memory of the investigator device.

At 430, the investigator device establishes a communicative connection to a target device. The investigator device may be connected wirelessly to the target device or may be connected via a wired connection to the target device.

At 440, the investigator device accesses a target file dataset on the target device. The target file dataset comprises N target files, wherein N is any integer greater than 0. That is, the investigator device, through the connection with the target device, is able to access information about at least one dataset of files on the target device.

At 450, the investigator device scans the target file dataset for size-matching target files in the target file dataset, wherein a size-matching target file is any file which have the same file size as the source file as shown by the appended source file hash value. There may be none, one, or more than one size-matching files.

A single byte difference in file size between two files will result in a hash value mismatch, therefore, any files in the target file dataset which do not match the file size of the source file are disregarded as they will not match the source file.

At 460, the investigator device generates target file hash values for size-matching target files. That is, the investigator device applies the hash function or other method of creating a hash value to the size-matching files.

At 470, the investigator device compares the source file hash value and the target file hash values and records any matches between target files and the source file. The investigator device may employ a bloom filter to identify matches between the source file hash value and the target file hash values.

At 480, proceed with the forensic investigation appropriately. Once a match between the source file and a file on the target device are found the forensic investigation may continue in whatever manner is appropriate for the circumstances of the investigation. This may include creating a record of the file match, transferring more information/data from the target device to the investigator device, searching for file matches for more source files, etc.

Depending on the context of the search, e.g. corporate, criminal, malware, etc., upon identification of a match between the source file and a file on the target device the investigator device 300 may execute further steps. For example, the match may be flagged as a match, which may trigger one or more processes. The investigator device 300 may generate an electronic message indicating the presence of a match. The message may be a visual message or an audio message. The visual message may be displayed in a user interface displayed on a screen of the investigator device. The audio message may be outputted via an audio output device of the investigator device. In some cases, a match may cause the investigator device 300 to invoke another program, such as an endpoint security tool. In some cases, the target file identified as a match may be one or more malware files and the identification of the target file match may cause the investigator device to invoke a file removal program for deleting or removing the target file match (malware file). The file removal program may be initiated automatically by the computer itself or through a user input via user interface presented by the investigator device 300. In some cases, a match identification may cause the investigator device 300 to invoke one or more programs for generating an electronic notification and sending the electronic notification to another device or a security system. The electronic notification may be a text notification, a visual notification presented via a user interface on a receiving device, an audio notification, or computer file. The electronic notification may be intended for human perception or processing by a computer device.

In some cases, after completion of a search using the investigator device 300, the investigator may determine what subsequent steps or action should be taken. For example, if the investigation was for a person of interest in a criminal case the next steps may entail ensuring that the evidence (e.g. the matched files, the target device, copy of target device) is handled properly to allow for an arrest of the person of interest. In the example of a corporate or employment related investigation, when files of interest are found by the investigator device 300, the employee may be reprimanded, fired, sued for breach of contract, etc. In another example, the investigator may have been searching for malware using the investigator device 300 and the next step upon finding file matches may include removing or deleting the malware. Where no matches are found, the investigator may take no action.

In some embodiments, the target file dataset may be stored on the target device throughout the execution of the method of identifying target device file matches by the investigator device 300. In such embodiments, the search occurs on the hard drive of the target device. In other embodiments, the search may occur on a hard drive of the target device that has been removed or copied from the target device. In other embodiments, the target file dataset or a subset of the target file dataset, or other target device data, metadata, or other information (e.g. size-matching files), may be transferred from the target device to the investigator device at some point during the execution of the method and the transferred files searched on the investigator device 300.

The location where the search of the files takes place (i.e. on which device the search occurs) may be dependent on the type of target device. For example, where the target device is a mobile phone, it may not be possible to run a search directly on the hard drive of the mobile phone. In such a case, the system may be configured to transfer the files to a device capable of running the search (e.g. the investigator device 300).

In other embodiments, the target device may be a cloud computing device (e.g. cloud server) and the target file dataset may be cloud files.

Figure 5:
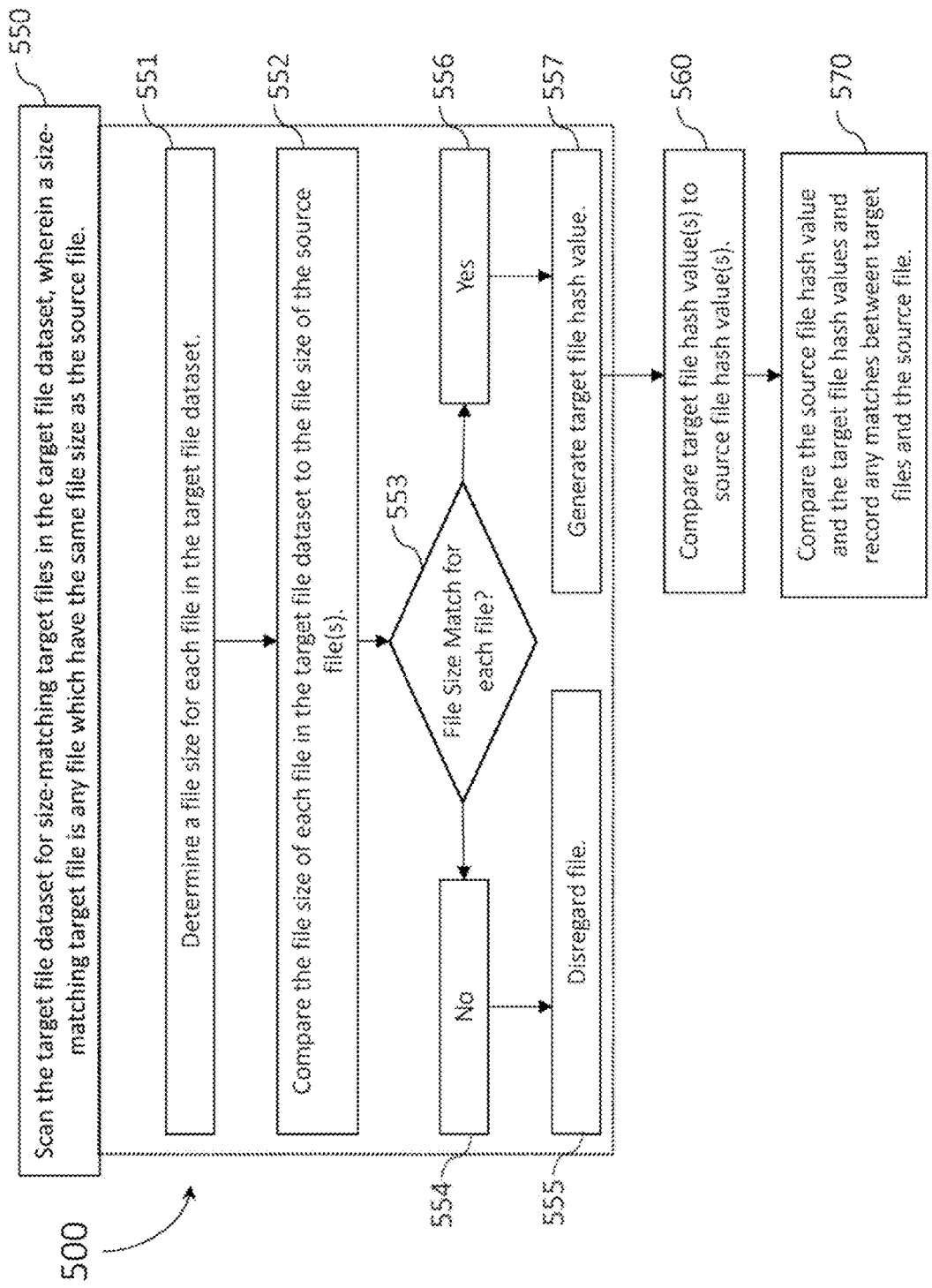
FIG. 5 is a flow diagram of a method of scanning target files on a target device to identify source file matches on a target device based on file size and hash values, according to an embodiment.

FIG. 5 is a flow diagram of a method 500 of scanning target files on a target device to identify source file matches on a target device based on file size and hash values, according to an embodiment.

Method 500 describes in further detail step 450 of method 400. Step 550 is identical to step 450 of method 400. Steps 551-557 provide more detail.

Method 500 occurs between steps 440 and 460 of method 400, therefore it is to be understood that step 410-440 of method 400 have occurred before step 551.

Step 560 of method 500 is similar to step 460 of method 400.

At step 550 of method 500 an investigator device scans the target file dataset for size-matching target files in the target file dataset, wherein a size-matching target file is any file which have the same file size as the source file. The target file dataset comprises N target files, where N is any integer greater than 0. Steps 551-557 are within a dashed line box attached to step 550 to show that they are substeps of step 550.

At 551, the investigator device determines a file size for each target file in a target file dataset of a target device.

At 552, the investigator device compares the file size of each file in the target file dataset to the file size of the source file(s) from an appended source file hash value of the source file.

At 553, the investigator device determines for each file in the target file dataset if the target file is a size-matching file, wherein a size-matching file is any file in the target file dataset that has an identical file size to the source file as shown by the appended source file hash value which includes the source file size. From step 553, the method diverges to two paths, either 554 and 555 or 556, 557, and 560.

At 554, it is found for a file in the target file dataset that the file has a different file size than the source file size in the appended source file hash value. Although herein, the file that has a different size than the source file is discussed in the singular, it is to be understood that a plurality of target files may have a different file size than the source file.

At 555, the file in the target file dataset which does not match the file size of the source file is disregarded. No further action is taken with the file for the specific source file of interest. In embodiments where a scan is being conducted for more than one source file simultaneously, a target device file which does not match a respective source file size is only disregarded for that respective source file and not for all source files unless the target device file does not match any of the source files of interest.

At 556, it is found for a file in the target file dataset that file has an identical file size to the source file size in the appended source file hash value and is, therefore, a size-matching file. Although herein, the size-matching file is discussed in the singular, it is to be understood that there may be a plurality of size-matching files in the dataset.

At 560, the investigator device generates a target file hash value for each size-matching file. That is the investigator device generates a target file hash value for each size-matching file using a hash function or other hash value creating method.

At 570, the investigator device compares the source file hash value to each target file hash value to determine if the files are a match. The investigator device may employ a bloom filter to identify matches between the source file hash value and the target file hash values.

Figure 6:
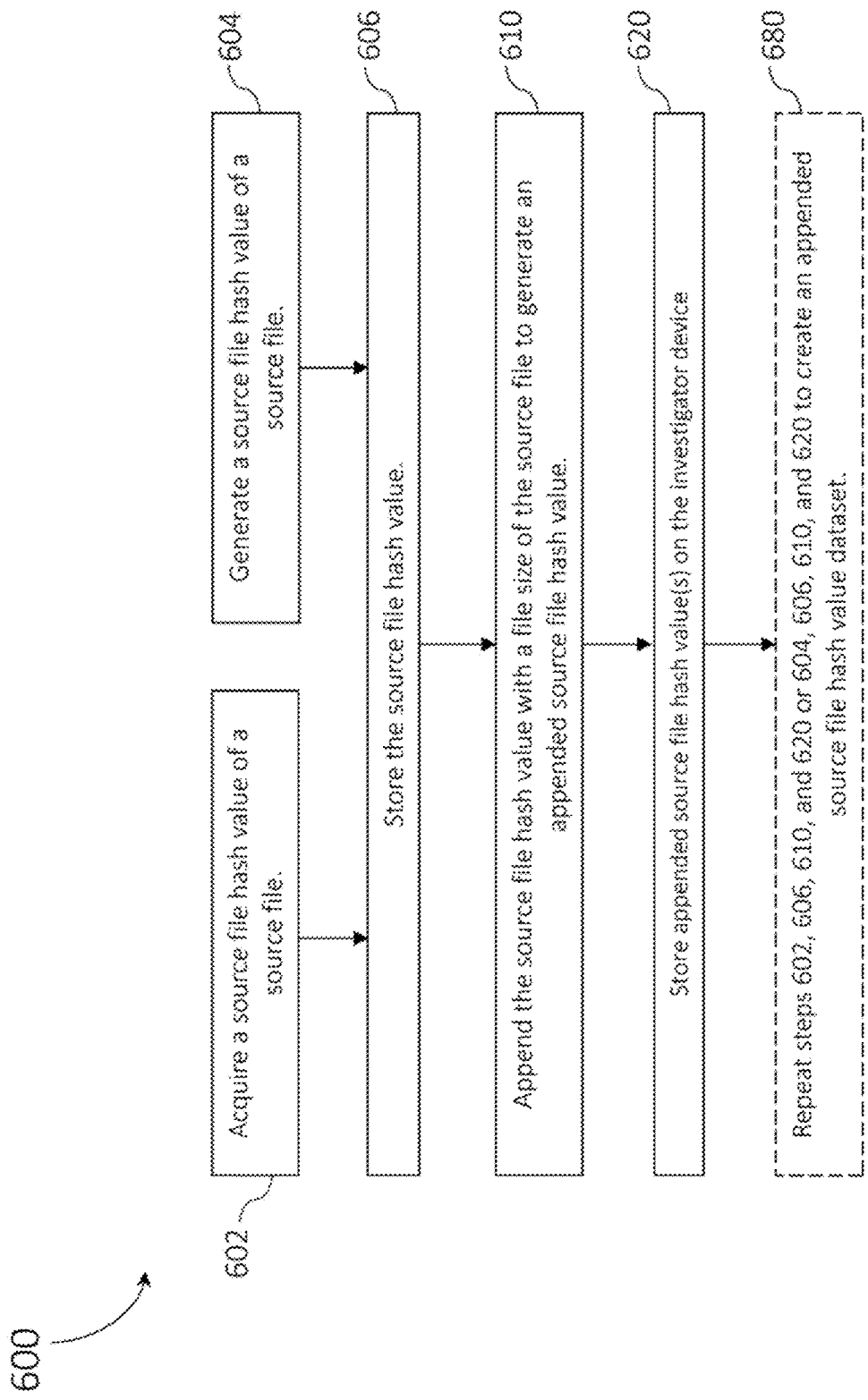
FIG. 6 is a flow diagram of a method of generating appended source file hash values, according to an embodiment.

FIG. 6 is a flow diagram of a method 600 of generating appended source file hash values, according to an embodiment.

Method 600 starts before step 410 of method 400. Step 610 of method 600 is similar to step 410 of method 400 and step 620 of method 400 is similar to step 420 of method 400.

At 602, an investigator device acquires a source file hash value of a source file from a third party storage device (i.e. a device which is not the investigator device or a target device). That is the investigator device receives an already created source file hash value from a third party storage device.

Alternatively to step 602, at 604, the investigator device generates a source file hash value of a source file. The source file hash value may be generated by the investigator device using a hash function or other method of creating hash values. The source file may be stored on the investigator device or the investigator device may access the source file on another device to create the source file hash value.

At 606, which follows directly from step 602 or step 604 but not both, the source file hash value is stored on the investigator device.

At 610, the investigator device appends the source file hash value with a file size of the source file to generate an appended source file hash value. The file size of the appended source file hash value is used by the investigator device to scan the target device for files which have identical file sizes to the source file.

At 620, the investigator device stores the appended source file hash value on the investigator device.

At 680, an optional step, the investigator device repeats steps 602, 606, 610, and 620 or 604, 606, 610, and 620 to generate and store more appended source file hash values.

The investigator device may create a dataset of appended source file hash values. Appended source file hash values in the dataset may be created simultaneously or in sequence and may be created from the method starting with step 602 or the method starting with step 604, or both methods. Once created and stored, appended source file hash values can be used to find file matches on any number of target devices in any number of investigations.

Figure 7A:
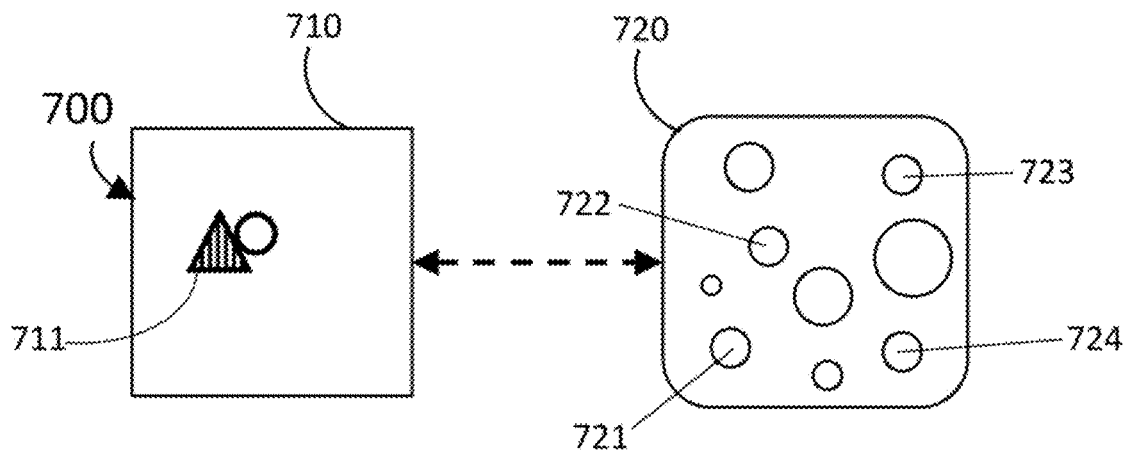
FIG. 7A is a schematic diagram of a method of identifying source file matches on a target device based on file size and hash values, according to an embodiment.
Figure 7B:
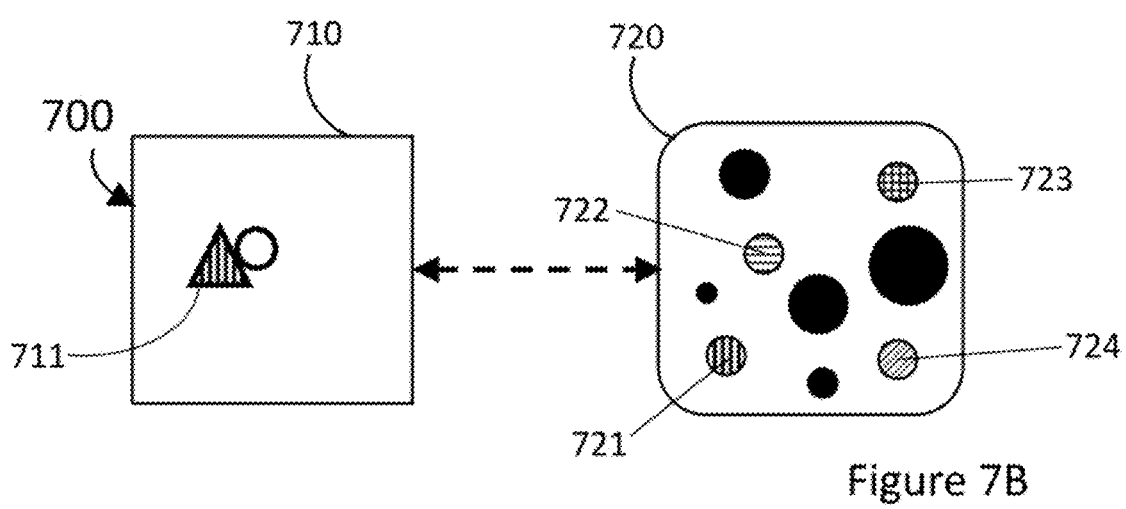
FIG. 7B is a schematic diagram of a method of identifying source file matches on a target device based on file size and hash values, according to an embodiment.
Figure 7C:
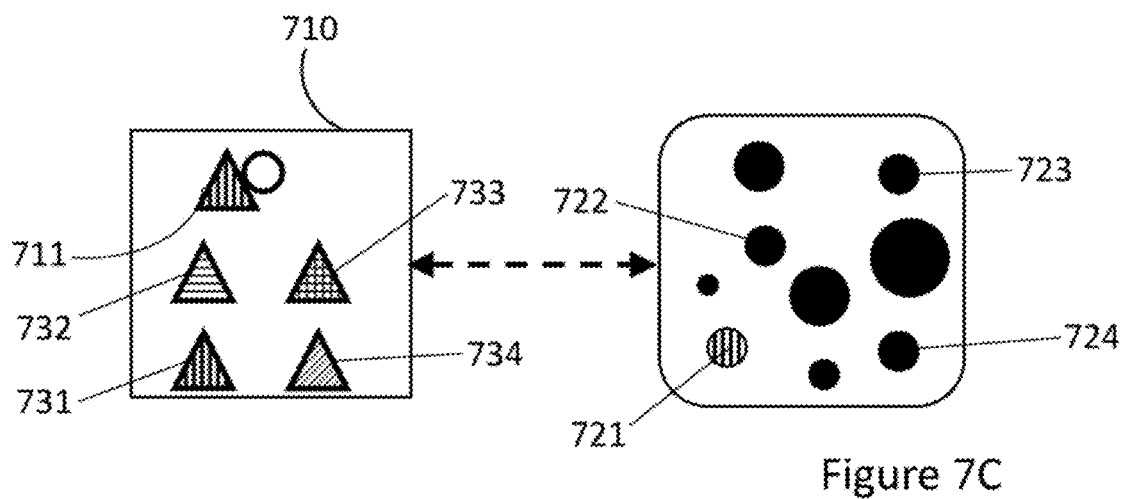
FIG. 7C is a schematic diagram of a method of identifying source file matches on a target device based on file size and hash values, according to an embodiment.

FIGS. 7A, 7B, and 7C are schematic diagrams of a system and method for identifying source file matches on a target device based on file size and hash values, according to an embodiment.

Aspects of the schematic diagrams of FIGS. 7A, 7B, and 7C, may be similar to the system of FIG. 1, the device of FIG. 3, and the methods of FIGS. 4-6.

FIGS. 7A, 7B, and 7C comprise an investigator device 710 including a stored appended source file hash value 711 of a source file comprising a source file hash value (triangle) and an appended file size (circle), and a target device 720 including a target file dataset (each file represented by a circle within target device 720). The target file dataset comprises N target files, where N is any integer greater than 0. In FIGS. 7A, 7B, and 7C, N=9.

Four of the target files have an identical file size to the source file, target files 721, 722, 723, and 724 (target files with different file sizes to the source file are not labelled to reduce clutter). The investigator device 710 is communicatively connected to the target device 720 (shown as two-headed dashed-line arrow).

FIG. 7A represents the investigator device 710 and the target device 720 after a connection has been established but before scanning of the target device dataset has occurred. The connection between the investigator device 710 and the target device 720 may be a wireless connection or may be a wired connection.

In FIG. 7A, no files in the target device dataset have been disregarded or found to be a match for the source file represented by the appended source file hash value 711.

In FIG. 7B, the investigator device has used the appended source file size of the appended source file hash value to scan the target file data set for size-matching files, wherein a size-matching file is any file within the target file dataset which has an identical file size to the source file. Files within the target file dataset which are not size-matching files have been disregarded (black circles). Target files 721 (horizontal stripes), 722 (vertical stripes), 723 (crosshatched), and 724 (diagonal stripes) are size-matching files.

In FIG. 7C, the investigator device has generated target file hash values 731 (horizontal stripes), 732 (vertical stripes), 733 (crosshatched), and 734 (diagonal stripes) for target files 721, 722, 723, and 724 respectively. The investigator device has also compared the target file hash values to the source file hash value and determined that target file 721 is a match for the source file hash value (shown as identical horizontal striped triangles). Target files 722, 723, and 724 have been disregarded (black circles) and are not matches for the source file based on the comparison between the respective target file hash values 732, 733, and 734 and the source file hash value.

Other embodiments of the file identification systems and methods of the present disclosure will now be described. While the previously described embodiments may provide a significant improvement over traditional file identification techniques through cryptographic hash algorithms, the additional embodiments described below may provide further improvements, such as through an increase in speed. Such increases in speed provided can be particularly advantageous in digital forensic investigations, where large amounts of data may need to be scanned (e.g. from multiple locations on a computer, a hard drive of a computer) and where time sensitivities may be prevalent (e.g. criminal investigations, corporate investigations of a departing employee).

Figure 8:
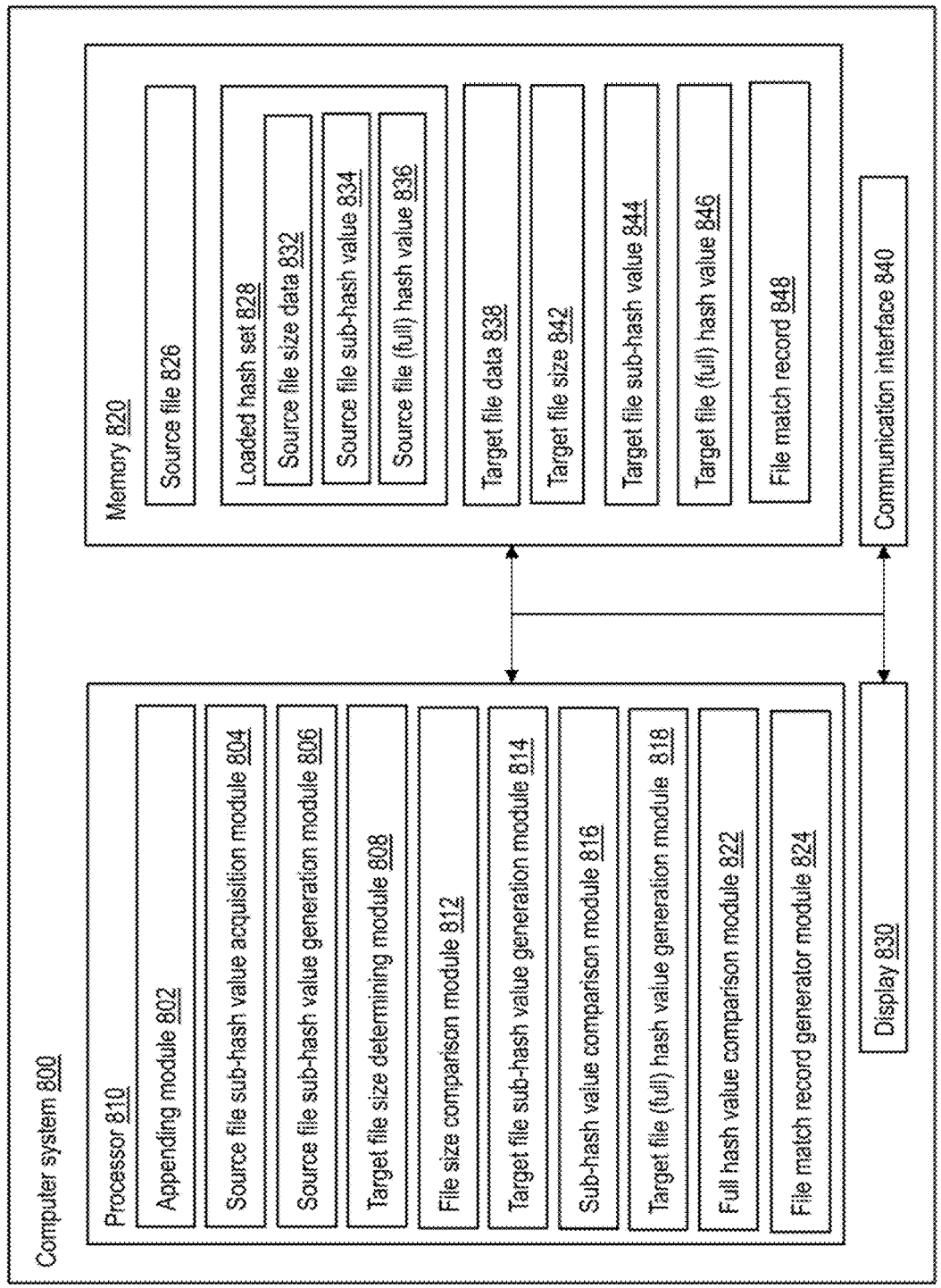
FIG. 8 is a block diagram of a computer system for identifying source file matches in a target dataset based on file size, sub-hash values, and hash values, according to an embodiment.

Referring now to FIG. 8, shown therein is a block diagram of computer system 800 for identifying source file matches on a target device based on file size, sub-hash values, and hash values, according to an embodiment. The computer system 800 may be implemented by the investigator device 110 of FIG. 1. The computer system 800 may be implemented on the investigator device 300 of FIG. 3 or may include components thereof not specified below.

The computer system 800 may perform the methods and processes described herein automatically upon establishing a connection between the computer system 800 and a target device or each module may be manually prompted by a human investigator. Operations or functions performed by the computer system 800 may be performed on the investigator device or on the target device. The computer system 800 may function as follows.

The computer system 800 includes a processor 810 and a memory 820. The processor 810 may be located at the investigator device, the target device, or both. The memory 820 may be located at the investigator device, the target device, or both. The processor 810 is communicatively connected to the memory 820.

The processor 810 may perform file match searches for source files for one source file at a time or may perform file match searches for multiple source files simultaneously as explained in system 300 and FIG. 3.

It is to be understood that, herein, any reference to a singular or plural source file, source file size, source file sub-hash value, source file hash value, appended source file hash value, target file, size-matching target file, target file hash values, or target file sub-hash value is solely for illustrative purposes and that a singularity or plurality of any of the above may be present in various embodiments.

The computer system 800 includes other components including an input device (e.g. a keyboard), a display 830 (with a user interface), communication interface 840 and an output device. The input device, display 830, communication interface 840, and output device may each be located at the investigator device, the target device, or both.

The memory 820 has instructions stored thereon which, upon execution by the processor 810, cause the computer system 800 to perform the functions of methods or processes discusses herein.

The computer system 800 is described as processing a target file and a source file. This is merely an example. Multiple target files may be processed using the computer system 800, whether part of a single target dataset including a plurality of target files (e.g. from a single target device) or from multiple target datasets. Similarly, the target file (or target files, as the case may be) can processed by comparison to a plurality of source files. As such, a single target file may be compared to a single source file, a single source file may be compared to a plurality of source files, a plurality of target files may be compared to a single source file, or a plurality of target files may be compared to a plurality of source files.

The memory 820 stores a loaded hash set 828.

The loaded hash set 828 includes, for each source file 826 represented in the loaded hash set 828, a source file size data 832, a source file sub-hash value 834, and a source file (full) hash value 836.

The source file size data 832, the source file sub-hash value 834, and the source file (full) hash value 836 may be linked or otherwise associated with one another. In an embodiment, the source file size 832 and the source file sub-hash value 834 may be appended to the source file (full) hash value 836. For example, the source file 826 may be represented in the loaded hash set 828 by a 32-bit value comprising a source file (full) hash value 836 of 16 bytes, a source file sub-hash value 834 of 8 bytes (which may be taken from a 16 byte sub-hash), and a source file size data 832 represented by 8 bytes. Such values are merely examples and may be configured differently in other embodiments, such as by using values or representations having other sizes.

The loaded hash set 828 may be generated by the computer system 800 or may be uploaded to the computer system 800 from another device (e.g. via communication interface 840).

Source files 826 may be stored in the memory 820 as explained in FIG. 3. These source files 826 may represent source files which are transferred to the computer system 800. The source files 826 may be received along with respective source file sub-hash values 834 or source file (full) hash values 836, or source files 826 may be transferred to computer system 800 without accompanying source file sub-hash value 834 or source file (full) hash value 836. Source files 826 may be file fragments or complete files.

Source file size data 832 may be transferred to the computer system 800 along with any one or more of a corresponding source file sub-hash value 834, source file (full) hash value 836, or source files 826 stored in memory 820. Source file size data 832 may be obtained from the source file 826 by the processor 810, or from the source file sub-hash value 834 or the source file (full) hash value 836 if such data includes the source file size data 832 (e.g. if the file size data 825 is linked or appended thereto).

The processor 810 includes an appending module 802.

The appending module 802 may function similarly to appending module 313 of FIG. 3.

The appending module 802 is configured to generate a loaded hash set 828 including an appended source file value for the source file 826 that includes the source file size data 832, the source file sub-hash value 834, and the source file (full) hash value 836. The appending module 802 may append the source file size data 832 and the source file sub-hash value 834 to the source file (full) hash value 836. Where the loaded hash set 828 is provided to the computer system 800, the computer system 800 may not include the appending module 802.

The processor 810 includes a source file sub-hash value acquisition module 804.

The source file sub-hash value acquisition module 804 is configured to receive and store a source file sub-hash value 834 that is provided to the computer system 800 (i.e. not generated by the computer system 800).

For example, the source file sub-hash value acquisition module 804 may enable uploading of a pre-existing source file sub-hash value 834 to the computer system 800. In some embodiments, the source file sub-hash value acquisition module 804 may not be present.

The source file sub-hash value acquisition module 804 acquires source file sub-hash values 834 from an external device. The external device may be any device capable of storing hash values and having the hash values transferred from the device to the computer system 800. A single source file sub-hash value 834 may be transferred to the computer system 800 or multiple source file sub-hash values 834 may be transferred at one time. The source file sub-hash values 834 may exist in a database of source file sub-hash values

834, and the entire database or a portion thereof may be transferred to the computer system 800.

The processor 810 includes a source file sub-hash value generation module 806.

The source file sub-hash value generation module 806 is configured to generate a source file sub-hash value 834.

For example, the source file sub-hash value generation module 806 may apply a cryptographic hash function or hash algorithm (e.g. MD5) to the source file 826 to generate the source file sub-hash value 834.

A "sub-hash" or "sub-hash value" as used herein refers to a hash value that is calculated using only a predetermined subset of a file's data (i.e. a subset of the file contents). This is in contrast to a "full hash" (also referred to herein as simply a "hash") which is calculated using the entire content of the file data. The predetermined subset of the file data used to calculate the sub-hash value is the same for target files and source files in order to provide a valid comparison between sub-hashes. The hash function or algorithm used to generate the sub-hash is the same for target files and source files being compared (e.g. MD5). The predetermined subset of the file data used for sub-hashing includes a predefined number of data blocks or fragments (one or more). Each data block is defined by a reading start location and a block size (block length). For example, a data block used to generate a sub-hash may be defined by a reading start location of the 25% mark in the file and a block size of 4 KB (i.e. starting at the 25% mark and reading 4 KB). In another example, a data block may be defined by a reading start location of the start of the file (offset 0) and a block size of 6 KB. The predefined sizes of the data blocks read from a file may be the same or different. Where multiple data blocks are used, the reading start locations may be evenly spaced apart throughout the file data or approximately evenly spaced apart (e.g. 0, 25% mark, 50% mark, last X bytes). The sub-hash is calculated by hashing the data blocks together using the hash function. In some case, the sub-hash value may be further processed to include or retain only a subset of the resulting hash value derived from hashing the data blocks (e.g. first 8 bytes of a resulting 16 byte MD5 hash). Generally, the process of generating the sub-hash of a file is less computationally intensive, in some cases significantly so, than generating a full hash of the same file by hashing only a predetermined subset (i.e. less) of the data in the file (and not reading and hashing the entirety of the file).

In an embodiment, the predetermined subset of data used to generate the sub-hash value may include a data block at the start of the file and a data block at the end of the file. Generally, data unique to a particular file may be located at the start and/or the end of the file. As such, data blocks sampled at or near the start and end of the file may advantageously provide data that is more likely to be unique to a file and thus less likely to present a data collision in the sub-hashing between two different files. The predetermined subset of data may also include one or more data blocks located closer to the middle of the file (e.g. 25%, 50%). The actual reading start location of the more central data block or blocks may be selected arbitrarily. Sampling data from these more central locations in the file may provide data samples that are less likely to be duplicated across multiple different files.

The sub-hash value is a fixed-digit representation of data (like a full hash). That is, a sub-hash value of the same length can be generated for file fragments of any size.

In an embodiment, and MD5 hash algorithm may be used to generate the source file sub-hash value 834. In other embodiments, other hash functions or algorithms may be used. In an embodiment using MD5, the sub-hash value may be generated by hashing four data blocks of a file together using the MD5 hashing algorithm. The four data blocks are approximately 4 KB each (block size) and are read from reading locations of the start of the file, 25% mark, 50%, and the last 4 KB of the file. The resulting MD5 hash of the subset of the file data (i.e. the sub-hash value) is 16 bytes. The sub-hash value may be further processed to retain only as subset of the calculated sub-hash value, such as the first 8 bytes of the 16 total bytes. Retaining only a subset of the calculated hash value as the sub-hash may provide improvements in speed and storage.

Identical files should have identical sub-hash values (where the sub-hashes are derived in the same way, that is, of the data blocks picked from the same location of the identical files). Non-identical files should have non-identical sub-hash values. This can be leveraged in the file matching process to identify target files that match source files (via sub-hash matching).

The processor 810 may also include a source file full hash acquisition module and/or a source file full hash generation module, which may function similarly to source file hash value acquisition module 311 and source file hash value generation module 312 of FIG. 3, respectively.

The memory 820 also stores target file data 838.

The target file data 838 may be stored similarly to target file data 327 in system 300 of FIG. 3.

The target file data 838 may be part of a target dataset including a plurality of target files.

The target file data 838 may be stored on the target device or may have been transferred from the target device and stored on the investigator device. Target file data 838 may include target file metadata such as file type, file size, file location, etc.

The processor 810 includes a target file size determining module 808.

The target file size determining module 808 may function similarly to the target file size determining module 314 of FIG. 3.

The target file size determining module 808 scans the target file data 838 to determine a target file size 842 of the target file 838. The target file size 842 is stored in the memory 820.

In some embodiments, the target file size determining module 808 may be configured to determine whether the target file size 842 meets a predetermined sub-hashing size threshold. The predetermined sub-hashing size threshold may be stored in memory 820. The sub-hashing size threshold is used to determine whether the target file data 838 should be sub-hashed (meets size threshold) or whether the target file data 838 should not be sub-hashed (does not meet size threshold) as part of the source file match identification process. If the target file size 842 meets the sub-hashing size threshold, then the target file data 838 may be sub-hashed using a target file sub-hash value generation module 814 (provided the target file is a file size match is detected, as described below). If the target file size 842 does not meet the sub-hashing threshold, then the target file data 838 skips the sub-hash generation and comparison stages (if target file data 838 is a size matching target file) and proceeds to full hash generation and comparison. The sub-hashing size threshold may be determined by the amount of target file data 838 that is hashed as part of the sub-hashing operation. For example, if the total amount of target file data sub-hashed is 16 KB (e.g. four blocks of 4 KB), then the sub-hashing size threshold may be 16 KB.

Using a 4 KB block size may be appropriate as, in some cases, 4 KB may be the smallest cluster size on a hard drive. Accordingly, the block size used for the sub-hashing operation may be determined based on a hard drive cluster size (e.g. smallest possible cluster size). The block size may be selected based on a common file system cluster size. The block size may match a common file system cluster size. In the 4 KB cluster size example, any amount of data less than that may still require reading 4 KB from the hard drive and thus there may be no performance advantage of reading less data. Further, 4 KB may provide enough data to not get too much duplicate sampling across different files while also not reading too much of the file such that the process is slowed down. Accordingly, the block size may be determined by trade-off between likelihood of duplicate sampling across different files and processing speed considerations. Further, the block size be determined by evaluation, such as by evaluating how effective a particular block size is at reducing the need for performing full hashes on different files.

In other embodiments, the predetermined subset of data for sub-hashing may include six blocks of 4 KB or four blocks of 8 KB. Such embodiments provide illustrative examples of how the predetermined subset of data can be differently configured and that the size and number of data blocks may vary in different embodiments and is not particularly limited.

The processor 810 includes a file size comparison module 812.

The file size comparison module 812 may function similarly to the target file size matching module 315 of FIG. 3.

The file size comparison module 812 uses the target file size 842 determined by the target file size determining module 808 and the source file size data 832 as input and compares the target and source file sizes 842, 832 to determine whether there is a match (i.e. a file size match, or size matching target file).

If a match is identified by the file size comparison module 812, a target file sub-hash value generation module 814 may be invoked for further processing of the target file data 838. If a match is not identified by the file size comparison module 812, the target file data 838 is disregarded.

Target files that have identical sizes to a source file of interest will generally be a subset of the total amount of target files. Generating and comparing sub-hash values of only size-matching target files may thus provide improvements in speed over performing such operations on all target files.

The processor 810 includes a target file sub-hash value generation module 814.

The target file sub-hash value generation module 814 may be invoked (e.g. automatically) upon a file size match being determined by the file size comparison module 812.

The target file sub-hash value generation module 814 uses the target file data 838 as input and generates a target file sub-hash value 844. The target file sub-hash value 844 is stored in the memory 820.

The target file-sub hash value generation module 814 functions similarly to the source file sub-hash value generation module 806 described above and such details regarding sub-hashes and sub-hash generation are not repeated here.

In embodiments including the source file sub-hash value generation module 806, the target file sub-hash value generation module 814 and the source file sub-hash value generation module 806 may be the same module.

Sub-hash values may be generated for each size matching target file detected in the target dataset.

The processor 810 includes a sub-hash value comparison module 816.

The sub-hash value comparison module 816 is configured to compare the target file sub-hash value 844 determined by the target file sub-hash value generation module 814 to the source file sub-hash value 834 in the loaded hash set 828 and determine if there is a match (sub-hash matching target file).

The sub-hash value comparison module 816 may perform the sub-hash value comparison automatically. The sub-hash value comparison module 816 may display the source file sub-hash values 834 from the loaded hash set 828 and the target file sub-hash values 844 on a user interface for manual comparison by a human.

The sub-hash value comparison module 816 may employ a bloom filter to compare the source file sub-hash values 834 from the loaded hash set 828 and the target file sub-hash values 844.

If a match is identified by the sub-hash value comparison module 816, a target file (full) hash value generation module 818 may be invoked for further processing of the target file data 838.

If a match is not identified by the sub-hash value comparison module 816, the target file data 838 is disregarded.

The processor 810 includes a target file (full) hash value generation module 818. The target file (full) hash value generation module 818 may be invoked (e.g. automatically) upon a sub-hash value match being determined by the sub-hash value comparison module 816.

The target file (full) hash value generation module 818 may function similarly to the target file hash value generation module 316 of FIG. 3.

The target file (full) hash value generation module 818 is configured to calculate a hash of the entire contents of the target file data 838 (i.e. the full target file).

The target file (full) hash value 846 is stored in the memory 820.

The processor 810 includes a full hash value comparison module 822.

The full hash value comparison module 822 may function similarly to the hash value comparison module 317 of FIG. 3.

The full hash value comparison module 822 is configured to compare the target file (full) hash value 846 to the source file (full) hash value 836 in the loaded hash set 828 and determine if there is a match (full hash matching target file).

The full hash value comparison module 822 may perform the full hash value comparison automatically. The full hash value comparison module 822 may display the source file (full) hash values 836 from the loaded hash set 828 and the target file (full) hash values 846 on a user interface for manual comparison by a human.

The full hash value comparison module 822 may employ a bloom filter to compare the source file (full) hash values 836 from the loaded hash set 828 and the target file (full) hash values 846.

It should be noted that the target file size determining module 808, file size comparison module 812, target file sub-hash value generation module 814, sub-hash comparison module 816, target file (full) hash value generation module 818, and full hash value comparison module 822 may be executed for a plurality of target file-to-source file comparisons. Further, such modules may be invoked automatically via output of another module.

The processor 810 also includes a file match record generator module 824.

The file match record generator module 824 may be invoked automatically upon identification by the full hash value comparison module 822 of a hash value match between the target file (full) hash value 846 and the source file (full) hash value 836.

The file match generator module 824 is configured to generate a file match record 848 for the target file data 838. The file match record 848 is stored in the memory 820.

The file match record 848 includes an indication that a match between a target file data 838 and a source file 826 has been found. The file match record 848 may include a target file identifier identifying the matching target file data 838. The file match record 848 may also include a source file identifier for the source file 826 that was a match for the target file data 838. The file match record 848 may include additional information about or metadata of the target file data 838, the source file 826, the match identification process, hashing algorithm used, etc. In some cases, the file match record 848 may include information or data that can be used to prove the match is forensically valid (e.g. any necessary information required to prove forensic validity).

The file match record generator module 824 may be configured to generate a file match notification in response to a full hash value match being identified by the full hash value comparison module 822.

The memory 820 may store metadata for the target file data 838 and upon a hash value match being identified the file match record generator module 824 may use certain metadata, such as a target file identifier (e.g. file name, file description, file location, etc.), to generate (and be included in) the notification.

The notification may be an electronic message. The notification may be displayed in a user interface generated by the processor 810. The notification may be displayed to a user, such as an investigator, via the display 830. Presentation of the notification to the user may be used to alert the user that a match has been found.

The file match record 848 may be generated at any point during a scan of a target dataset (e.g. immediately upon a match being identified, after scanning of the entire dataset is complete).

A file match record 848 may be generated for each search regardless of whether any match is found or may only be generated if a search finds a match.

In some cases, the file match record generator module 824 may be configured to generate a file match report.

The file match report may be displayed via the display 830 (e.g. in a user interface).

The file match report may include one or more file match records 848. The file match report may include file match records 848 for only those target files 838 found to be full hash value matches.

The file match record 848 or the file match report may be automatically populated. The file match record 848 or the file match report may be generated and displayed to a user in a user interface for manual population by the user.

The processor 810 may further include a module for establishing a connection with the target device either wirelessly or through a wired connection (e.g. a USB connection).

The processor 810 may further include a decryption module or similar module for accessing data or files on the target device which have been hidden or protected.

The processor 810 may further include a module for choosing which drives of the target file dataset to search on the target device.

Figure 9:
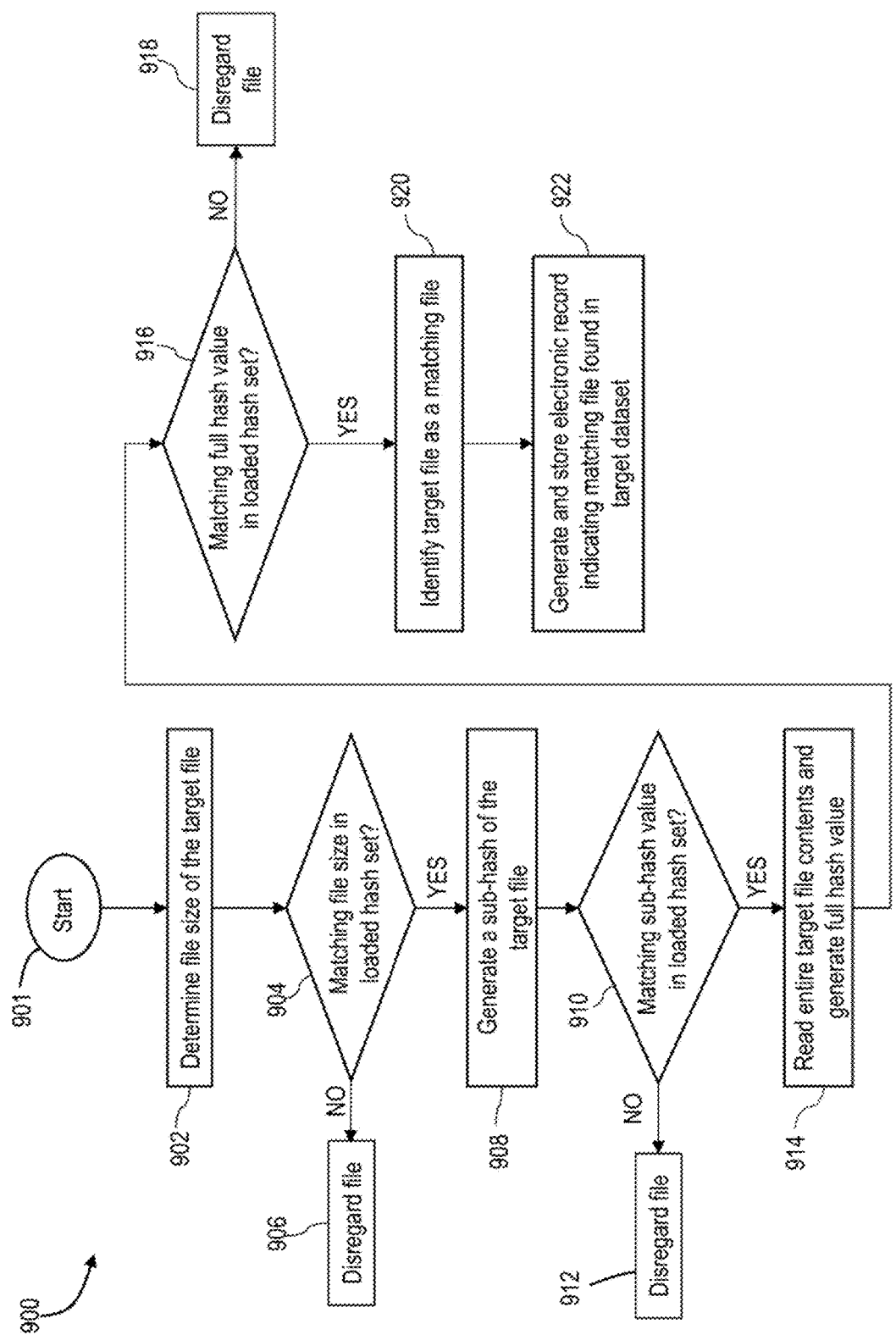
FIG. 9 is a flow diagram of a method of identifying source file matches in a target dataset based on file size, sub-hash values and hash values, according to an embodiment.

Referring now to FIG. 9, shown therein is a method 900 of identifying source file matches on a target device based on file size, sub-hash values, and hash values according to an embodiment.

The method 900 may be implemented by the computer system 800 of FIG. 8. In particular, the method 900 may be implemented by the processor 810 of FIG. 8, such as by one or more of the modules of FIG. 8.

Method 900 refers to a single investigator device, however, it is to be understood that the investigator device may include multiple computing devices and various steps, or storage of data/information may occur on one or more of the computing devices of the investigator device.

Generally, prior to the start of the method 900, the investigator device establishes a communicative connection to a target device. The investigator device may be connected wirelessly to the target device or may be connected via a wired connection to the target device. The connection between the investigator device and the target device may be contemporaneous with the performance of the method 900 (or steps thereof). For example, the method 900 may be performed by the investigator device while connected to the target device. Similarly, the method 900 may be performed by the investigator device while not connected to the target device, such as in cases where a target dataset has been uploaded to the investigator device or other device accessible to the investigator device. For any reference to a target file being on a target device, it is to be understood that this includes scenarios in which the target file (e.g. as part of a target dataset) has been transferred from the target device. Such transferred target dataset can then be accessed by the investigator device (e.g. by storing the target data on the investigator device or in a manner otherwise accessible to the investigator device) for processing via method 900.

The method 900 is performed using a loaded hash set as a reference for performing file size matching, sub-hash value matching, and full hash value matching. The loaded hash set may be the loaded hash set 828 of FIG. 8. The loaded hash set may be stored in memory 820.

For a source file represented in the loaded hash set 828, the loaded hash set 828 includes source file size data 832, a source file sub-hash value 834, and a source file (full) hash value 836. The source file size data 832, source file sub-hash value 834, and source file (full) hash value 836 for a source file 826 may be linked or otherwise associated. In one embodiment, the source file size data 832 and the source file sub-hash value 834 may be appended to the source file (full) hash value 836. The appending may be performed by the appending module 802 of FIG. 8.

The sub-hash values and full hash values for the source file 826 may be generated by the investigator device, for example using sub-hash and full hash value generator modules, or may be provided to the investigator device, for example using sub-hash and full hash acquirer modules. The source file sub-hash value 834 may be acquired from a database, storage device, or other computing device that contained the source file sub-hash value 834 or multiple source file sub-hash values 834.

Multiple different source files 826 may be represented in the loaded hash set 828, with each source file 826 in the loaded hash 828 set having a source file size data 832, a source file sub-hash value 834, and a source file (full) hash value 836. This may enable target files in the target dataset to be checked against multiple source files during a scan of the target dataset. In some cases, a user may select, for example via a user interface running on the investigator device, a subset of source files 826 in the loaded hash set 828 to be searched for in the target dataset. For example, the investigator may store and display a list of source files 826 in the user interface from which the user can select the source files 826 to be searched for in the target dataset.

At 901, the method 900 starts.

At 902, a file size of the target file 838 is determined.

The target file size 842 may be stored in memory 820. The file size determination may be performed by the target file size determining module 808 of FIG. 8. The processor 810 may access a target file dataset on the target device (or on the investigator device, if the target file dataset has been transferred from the target device). The target file dataset includes N target files, wherein N is any integer greater than 0. That is, the processor 810, through the connection with the target device, is able to access information about at least one dataset of files on the target device.

At 904, the target file size 842 determined at 902 is compared to one or more file sizes (of one or more source files) in the loaded hash set 828 to determine if any source file size data 832 in the loaded hash set 828 matches the target file size 842.

If a file size match is not detected at 904, the method proceeds to disregard the target file 838 at 906.

Disregarding the target file means concluding that the target file is not (does not match) a source file 826 represented in the loaded hash set 828. No further action may be taken with the target file. In embodiments where a scan is being conducted for more than one source file 826 simultaneously, a target device file whose file size does not match a respective source file size data 832 is only disregarded for that respective source file 826 and not for all source files unless the target device file size does not match the file size any of the source files of interest.

If a file size match is detected at 904, the method proceeds to 908. The target file having a file size matching a source file size 832 in the loaded hash set 828 may be referred to as a "size matching target file".

At 908, a sub-hash value is generated for the target file.

Although herein, the size-matching file is discussed in the singular, it is to be understood that there may be a plurality of size-matching files in the dataset. The sub-hash value is generated using a hash function or algorithm or other hash value creating method. The hash function corresponds to the hash function used to generate the source file sub-hash value in the loaded hash set 828 to which the target file sub-hash value 844 is compared.

The sub-hash value is a hash value of a fragment or data block of a full target file or a combination of fragments or data blocks of a full target file, such as described in reference to FIG. 8. The sub-hash may be a hash value of any data block or combination of data blocks of the full target file. When generating the sub-hash value, the entire data content of the target file is not read. Only the specific data block or combination of data blocks for which sub-hash value is to be generated may be read.

The sub-hash is generated from one or more blocks or fragments of the target file. In an embodiment, the number of blocks is four.

The one or more blocks include a block size corresponding to the size of the block. The block size may be the same for all blocks. For example, the block size may be ~4 KB (e.g. 4096 bytes). Generally, the total size of the combined blocks from the target file is smaller than the total size of the file, and in some cases considerably so. If the size of the target file is smaller than the total size of the combined blocks (e.g. file size<number of blocks×block size), then a hash may be generated using the entire target file content (and thus be a "full hash" rather than a "sub-hash"). In such cases, the method 900 may automatically proceed to 914 for generation of the full hash value (e.g. from a determined match at 904 to 914). Such minimum target file size may be referred to as a size threshold for reading a portion of the target file (i.e. a combination of blocks or fragments) versus reading the entire file content.

Each block of the target file used to generate the sub-hash has a predetermined reading location or position. The predetermined reading locations may be evenly spaced or generally evenly spaced across the target file. For example, four blocks of the target file may be read at the following locations within the target file: the start of the file (offset 0), the 25% mark, the 50% mark, and the last X bytes where X is equal to the block size.

In an embodiment, the sub-hash may be a 4×4 sub-hash. The 4×4 sub-hash includes four 4096 byte (~4 KB) blocks from the target file for a total of approximately 16 KB. The four blocks are read from the following predetermined file locations: the start of the file (offset 0), the 25% mark, the 50% mark, and the last ~4 KB. If the file is 16 KB or smaller, the entire file is read. The four blocks are hashed together using the MD5 cryptographic hash algorithm to generate a 16 byte hash. In some cases, only the first 8 bytes of the resulting 16 bytes MD5 hash (sub-hash) are retained. Retaining only the first 8 bytes of the resulting 16 byte MD5 hash may provide improvements in speed and/or space requirements.

The step of retaining only a subset of the sub-hash value for comparison purposes may provide particular advantages. Generally, while there may be some matches for different files using only the subset of the sub-hash, such matches (false positives) may still be unlikely. Further, keeping the sub-hash size smaller by retaining only a subset may provide significant storage advantages when dealing with large sets of source files (e.g. millions or billions of files) by reducing space required to store the sub-hash values. Naturally, there may be some tradeoff when using only a subset of the sub-hash value between a higher chance of collision and saving space by using less data. Thus, in cases where the number of source files may be high, the subset of the sub-hash retained or used may be smaller provided any increase in the chance of collision is acceptable. In cases where the number of source files is lower or where space is not a concern, the subset of the sub-hash retained may be larger in order to reduce chance of false positives. The portion of the sub-hash retained or used may vary and is thus not particularly limited.

The sub-hash generation at 908 may be performed for each size matching target file identified in a target dataset. As described, the sub-hash generation at 908 may be performed only for size matching target files meeting a predetermined size threshold (while those not meeting the threshold are fully hashed).

At 910, the sub-hash of the target file generated at 908 is compared to the source file sub-hash value 834 from the loaded hash set 828 to determine if the target and source files are a sub-hash match.

In an embodiment, a bloom filter may be used to identify matches between the target file sub-hash value 844 and the source file sub-hash value 834.

The comparison at 910 may include comparing the sub-hash of the target file to the sub-hash of the source file having the matching file size as determined at 904 or may include comparing the sub-hash of the target file to all of the source file sub-hash values in the loaded hash set.

If a sub-hash value match for the target file sub-hash is not detected at 910, the method proceeds to disregard the target file 838 at 912.

At 912, the file in the target file dataset which does not match the sub-hash value of the source file is disregarded. This may include taking no further action with the target file. In embodiments where a scan is being conducted for more than one source file simultaneously, a target device file sub-hash which does not match a respective source file sub-hash value 834 is only disregarded for that respective source file and not for all source files unless the target device file sub-hash does not match sub-hash values of any of the source files of interest (i.e. in the loaded hash set).

If a sub-hash match is detected at 910, the method proceeds to 914. The target file having a sub-hash value matching a source file sub-hash in the loaded hash set may be referred to as a "sub-hash matching target file".

At 914, the entire contents of the target file are read and a full hash value is generated of the target file using a hash function or algorithm.

The hash value (full hash or sub-hash) may, for example, be an MD5 hash value. In other embodiments, other hashing functions or algorithms may be used, such as SHA-1, SHA-256, SHA-512, or SHA-1024.

The hash function or algorithm used to generate the full hash value may be the same hash function or algorithm used to generate the sub-hash value. The hash function or algorithm used to generate the full hash value may be a different hash function or algorithm than the hash function or algorithm used to generate the sub-hash value.

The hash of the entire file contents of the target file at 914 may be referred to as a "full hash" or "full hash value" (to contrast with sub-hash, which is a hash calculated using a portion or subset of the file contents of the target file). Generally, the hash function or algorithm used to generate the full hash of the target file is the same hash function or algorithm used to generate the source file full hash(es) to which the target file hash is compared to enable a valid comparison.

The full hash generation at 914 may be performed for each sub-hash matching target file in a target dataset.

It should be understood that, in some cases, a "full" hash of the target file may be determined at 908. That is, a hash of the entire contents of the target file may be generated where the size of the target file does not meet the size threshold of the sub-hash (and thus the entire file is hashed), as described above. The method 900 may be configured to account for this scenario and avoid duplication of generating the hash of the entire target file for target files that are smaller than the size threshold of the sub-hash. This may be done by generating the full hash value of the target file only once and comparing the target file (full) hash value 846 to the source file (full) hash values 836 in the loaded hash set 828 only once. Such approach may avoid unnecessary processing associated with generating the same hash twice and comparing the same hash twice.

At 916, the hash value of the full target file is compared to the source file (full) hash value 836 from the loaded hash set 828 to determine if the target and source files are a full hash match.

A bloom filter may be used to identify matches between the target file (full) hash value 846 and the source file (full) hash value(s) 836.

The comparison at 916 may include comparing the hash of the target file to the hash of the source file having the matching file size and matching sub-hash as determined at 904, 910 or may include comparing the hash of the target file to all of the source file hash values in the loaded hash set 828.

If a hash value match for the target file (full) hash value 846 is not detected at 916, the method proceeds to disregard the target file at 918.

At 918, the file in the target file dataset which does not match the hash value of the source file is disregarded. This may include taking no further action with the target file. In embodiments where a scan is being conducted for more than one source file simultaneously, a target device file hash value which does not match a respective source file hash value is only disregarded for that respective source file and not for all source files unless the target device file hash value does not match hash values of any of the source files of interest.

If a hash value match for the target file hash value is detected at 916, the method proceeds to 920. The target file having a (full) hash value matching a source file (full) hash value 836 in the loaded hash set 828 may be referred to as a "hash matching target file" or "full hash matching target file".

At 920, the target file is identified as a matching file. This confirmation indicates that a source file of interest, represented in the loaded hash set 828, is present in the target dataset. The basis of the identification of the target file as a match is the matching full hash values determined at 916. So, for example, the identification may confirm that a particular file of forensic value is or was present on the target device.

Confirmation at 920 may include generating and displaying a notification of the matching target file in a user interface. The notification may include various information or metadata about the target file, the matching source file, or the match identification process. Such information or metadata provides the user with information about the file match and may also enable the user to perform a manual confirmation upon viewing and reviewing the notification. In some cases, the confirmation of the file match may be performed automatically by the investigator device.

At 922, an electronic file match record is generated indicating a matching target file was found in the target file dataset (e.g. file match record 824 of FIG. 8). The file match record may be stored in memory 820.

The file match record 848 may include or otherwise reference or link to the target file that is a match. The file match record 848 may include various information or metadata about the file match. Such information or metadata may include information or metadata about the target file, the matching source file, or the match identification process (e.g. target device ID, target device owner, scan timestamp, hashing algorithm used, matching file sizes, matching sub-hashes, matching full hashes, etc.).

The file match record 848 may include a case summary record or a match report as explained in computer system 800 and FIG. 8. The file match record 848 and the matched target file may be stored in the memory 820. The file match record 848 and the matched target file may be displayed on the user interface.

The file match record 848 may be sent from the investigator device to another device through a network connection. This transmission of the file match record may occur automatically upon generation of the file match record 848. This may be used to transfer knowledge of the target file match to other electronic information systems or to alert other interested parties on other devices of the target file match.

In some cases, the method 900 may also include generating an electronic case summary record. The case summary record may be stored in the memory 820. The case summary record describes the file match identification process performed for the target dataset. The case summary record may include information or metadata about the target device (e.g. device ID, device owner), the target dataset (e.g. number of files, location on target device, list of files in target dataset), the investigator (e.g. name, investigator ID), the investigator device (e.g. device ID, device owner or user), or the file match identification process for the target dataset (e.g. timestamp of the scan, list of files scanned, result for each scanned file, list of target device locations scanned, etc.). The case summary record may provide a comprehensive summary of the target dataset scanning operation.

The file match record 848 generated at 922 may be linked to or otherwise associated with the case summary record (e.g. by a reference or pointer to the file match record in the case summary record). This may enable a user to have a record of both the overall scan of the target dataset and individual target file matches detected.

Upon identification of a match between the target file and a source file represented in the loaded hash set 828, further steps may be executed, for example by the investigator device, such as described in method 400. In some cases, after completion of a search using the investigator device, the investigator may determine what subsequent steps or action should be taken as described in method 400.

While the embodiments described in reference to FIGS. 8 and 9 are described as including a file size match determination operation performed in addition to a sub-hash match determination and a full hash determination (e.g. prior to the sub-hash match determination), it is to be understood that, in some embodiments, the file size match determination may not be performed. In such embodiments, a sub-hash match determination may be performed, and a full hash match determination performed subsequently on sub-hash matching target files. Such an approach may still provide advantages, such as increased processing speed, over traditional approaches using full hashes of all files in a target dataset.

The embodiments of the systems and methods for file match identification described in FIGS. 8 and 9 may provide various advantages over traditional methods of identifying files based on hash signatures. Traditional methods of identifying files based on hash signatures involve using various cryptographic hash algorithms like to generate a fingerprint of a complete file and do a hash value comparison. These methods involve a lengthy operation and are time consuming, especially if some of the files are large. The embodiments of the systems and methods of FIGS. 8 and 9 may also provide advantages over other embodiments of the present disclosure which use a file size match determination prior to performing a hash value comparison.

In the embodiments of FIGS. 8 and 9, firstly a file size comparison between target file size data and source file size data is conducted. Target files with different target file size data compared to source file size data may be disregarded. Thereafter, a sub-hash value is generated for target files with matching file sizes to the source file size. While generating a sub-hash value, the entire data content of the target file is not read. Only the specific data block or the combination of data blocks for which sub-hash value is to be generated is read. Identical files may have identical sub-hash values of the data blocks picked from the same location of each file. Only those target files with matching file size and sub-hash values to the file size and sub-hash values of source file respectively are read completely. Full hash values are generated for size matched and sub-hash matched target files. Thereafter, full hash values of complete target files are matched with source file hash value to determine a match. This approach of performing sequentially more processing-intensive target file to source file comparison operations on the target files may advantageously reduce processing requirements by only performing the more computationally-intensive operations when a less computationally-intensive operation has indicated a match (and thus indicating it is worthwhile to conduct the subsequent comparison to confirm the match).

The advantages provided by the systems and methods of the present disclosure employing sub-hash comparison are further illustrated through collected test data.

Tests on various data sets have been performed and reveal faster processing speeds and reduced time requirements for the systems and methods of the present disclosure using sub-hash value matching over conventional complete file hash value matching. Generally, sub-hash value comparison is advantageous in reducing the time consumed in reading the entire file and conducting a full hash value comparison for irrelevant files.

Tests were conducted to record speed reductions and reliability of employing sub-hash comparison. The tests conducted employed a file-size comparison, followed by a 4×4 sub-hash value comparison for size matched files as explained herein, and finally a full MD5 hash comparison of sub-hash matching files. The approach used in testing included, for the sub-hash comparison, generating four 4096 byte blocks from the target file at locations of the start of the file (offset 0), the 25% mark, the 50% mark, and the last ~4 KB of the file, hashing the blocks together using an MD5 cryptographic hash algorithm, and retaining only the first 8 bytes of the resulting 16 byte MD5 hash. For files smaller than 16 KB, the entire file was read. The loaded hash set, used for comparison, included a 32 byte value comprising the full MDA hash value for the file (16 bytes), the 8 byte sub-hash, and 8 bytes representing the file size.

In approximately 50 test scans, an average speed improvement of 3.35 times faster compared to traditional MD5 hashing was observed. Speed improvements ranged from 2.43× to 4.83× higher speeds. This provides an improvement in matching speeds using sub-hash comparison between target files and source files. Comparatively, scanning all the contents of a target file by generating a full hash value is time consuming, especially for larger files.

In the testing, approximately 38% of target files matched with the source file size (were size matching target files) and thus proceeded to sub-hash comparison. Then, 4×4 sub-hash values were generated for the 38% of target files which were size matching.

Of the 38% of size matching target files that were sub-hashed, 14% were sub-hash matching target files (i.e. possible hits) and thus proceeded to full hashing. In total, of all the target files in the scan only 8% proceeded to and were fully MD5 hashed, providing a 92% reduction in full hashing of target files. In other words, 92% of target files in the scan were disregarded prior to full MD5 hashing. Of the 8% of the target files that were fully MD5 hashed, 90% were matches (i.e. only 10% of the target files that proceeded to and were fully MD5 hashed were not matches). This indicates the speed improvement provided by an approach in which full hashes of target files are only generated once the target files have been identified as size matching and sub-hash matching.

While the above description provides examples of one or more apparatus, methods, or systems, it will be appreciated that other apparatus, methods, or systems may be within the scope of the claims as interpreted by one of skill in the art.

The invention claimed is:

1. A computer-implemented method of forensically investigating a target dataset including a target file by comparing the target file to a source file, the method comprising:
performing a file size matching operation to determine if a file size match between the target file and the source file exists, including:
determining a file size of the target file ("target file size");
comparing the target file size to a file size of the source file ("source file size"); and
where the target file size matches the source file size, identifying the file size match between the target file and the source file;
upon identifying a file size match, determining whether the target file size meets a predetermined file size threshold stored in a computer readable storage medium, the predetermined file size threshold for determining whether to perform a sub-hash matching operation or skip the sub-hash matching operation and proceed directly to a full hash matching operation;
if the target file size meets the predetermined file size threshold, performing the sub-hash matching operation to determine if a sub-hash match between the target file and the source file exists, including:
generating a sub-hash value of the target file ("target file sub-hash value") for comparing to a sub-hash value of the source file ("source file sub-hash value"), wherein the target file sub-hash value and the source file sub-hash value each represent a hashing of a predetermined subset of data in the target file and the source file, respectively, with a first hash function;
comparing only a portion of the target file sub-hash value to a same portion of the source file sub-hash value, the portion being smaller than the target file sub-hash value and the source file sub-hash value, wherein the predetermined subsets of the target file and the source file are subsets of the same size and from the same location of the target file and source file, respectively, and the portion of the target file sub-hash value and source file sub-hash value are portions of the same size and from the same location of the predetermined subsets of the target file and source file, respectively; and
where the portion of the target file sub-hash value matches the same portion of the source file sub-hash value, identifying the sub-hash match between the target file and the source file; and
if the sub-hatch match is identified or the target file size does not meet the predetermined file size threshold, performing a full hash matching operation to determine if a full hash match between the target file and the source file exists, wherein performing the full hash matching operation includes:
generating a full hash value of the target file ("target file full hash value"); and
comparing the target file full hash value to a full hash value of the source file ("source file full hash value");
wherein the target file full hash value and the source file full hash value each represent a hashing of the entire data in the target file and the source file, respectively, with a second hash function.

2. The method of claim 1, further comprising using an appended source file full hash value including the source file size and the source file sub-hash value each appended to the source file full hash value for the file size matching operation, the sub-hash matching operation, and the full hash matching operation.

3. The method of claim 1, wherein the predetermined subset of data used to generate the target file sub-hash value and the source file sub-hash value includes one or more data blocks, each data block having a predefined reading start location and a predefined block size.

4. The method of claim 3, wherein the one or more data blocks includes a plurality of data blocks, and wherein the predefined block size of each of the plurality of data blocks is the same.

5. The method of claim 3, wherein the one or more data blocks includes a plurality of data blocks, and wherein the predefined reading location and the predefined block size of the plurality of data blocks are defined such that the plurality of data blocks are non-overlapping.

6. The method of claim 3, wherein the one or more data blocks includes a first data block and a second data block, wherein the first data block is at the start of the file and the second data block is at the end of the file.

7. The method of claim 1, wherein generating the target file sub-hash value includes retaining only the portion of the target file sub-hash value.

8. The method of claim 1, further comprising:
generating an electronic file match record upon determining a full hash match between the target file and the source file; and
displaying the electronic file match record in a user interface.

9. The method of claim 1, wherein the first hash function and the second hash function are the same hash function, and wherein the hash function is a cryptographic hash algorithm.

10. A computer system for forensically investigating a target dataset including a target file by comparing the target file to a source file, the computer system including a processor and a memory in communication with the processor, the memory storing computer-executable instructions which when executed by the processor cause the computer system to:
perform a file size matching operation to determine if a file size match between the target file and the source file exists, including:
determining a file size of the target file ("target file size");
comparing the target file size to a file size of the source file ("source file size"); and
where the target file size matches the source file size, identifying the file size match between the target file and the source file; and
upon identifying a file size match, determine whether the target file size meets a predetermined file size threshold stored in a computer readable storage medium, the predetermined file size threshold for determining whether to perform a sub-hash matching operation or skip the sub-hash matching operation and proceed directly to a full hash matching operation;
if the target file size meets the predetermined file size threshold, performing the sub-hash matching operation to determine if a sub-hash match between the target file and the source file exists, including:
generating a sub-hash value of the target file ("target file sub-hash value") comprising a first number of characters for comparing to a sub-hash value of the source file ("source file sub-hash value"), wherein the target file sub-hash value and the source file sub-hash value each represent a hashing of a predetermined subset of data in the target file and the source file, respectively, with a first hash function;

comparing only a portion of the target file sub-hash value to a same portion of the source file sub-hash value, the portion being smaller than the target file sub-hash value and the source file sub-hash value, wherein the predetermined subsets of the target file and the source file are subsets of the same size and from the same location of the target file and source file, respectively, and the portion of the target file sub-hash value and source file sub-hash value are portions of the same size and from the same location of the predetermined subsets of the target file and source file, respectively; and where the portion of the target file sub-hash value matches the same portion of the source file sub-hash value, identifying the sub-hash match between the target file and the source file; and if the sub-hatch match is identified or the target file size does not meet the predetermined file size threshold, perform a full hash matching operation to determine if a full hash match between the target file and the source file exists, wherein performing the full hash matching operation includes:

generating a full hash value of the target file ("target file full hash value"); and comparing the target file full hash value to a full hash value of the source file ("source file full hash value");

wherein the target file full hash value and the source file full hash value each represent a hashing of the entire data in the target file and the source file, respectively, with the same hash function.

11. The system of claim 10, wherein the predetermined subset of data used to generate the target file sub-hash value and the source file sub-hash value includes one or more data blocks, each data block having a predefined reading start location and a predefined block size.

* * * * *